United States Patent
Xue et al.

(10) Patent No.: US 11,910,360 B2
(45) Date of Patent: Feb. 20, 2024

(54) OPPORTUNISTIC COOPERATIVE RELAYING OF SIDELINK SIGNALS

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Jing Sun, San Diego, CA (US); Tao Luo, San Diego, CA (US); Piyush Gupta, Bridgewater, NJ (US); Juan Montojo, San Diego, CA (US); Peter Gaal, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/505,539

(22) Filed: Oct. 19, 2021

(65) Prior Publication Data

US 2023/0124012 A1  Apr. 20, 2023

(51) Int. Cl.
*H04W 72/02* (2009.01)
*H04L 5/00* (2006.01)
(Continued)

(52) U.S. Cl.
CPC ......... *H04W 72/02* (2013.01); *H04L 5/0053* (2013.01); *H04W 16/28* (2013.01); *H04W 72/046* (2013.01); *H04W 72/0453* (2013.01)

(58) Field of Classification Search
CPC . H04W 72/02; H04W 16/28; H04W 72/0453; H04W 72/046; H04W 72/20;
(Continued)

(56) References Cited

U.S. PATENT DOCUMENTS

2006/0171366 A1* 8/2006 Suzuki ............... H04L 45/02
370/351
2016/0173239 A1* 6/2016 Kim ................... H04L 1/1812
370/329
(Continued)

FOREIGN PATENT DOCUMENTS

WO WO-2020064304 A1 * 4/2020
WO WO-2022139825 A1 * 6/2022
WO WO-2023036933 A1 * 3/2023

OTHER PUBLICATIONS

International Search Report and Written Opinion—PCT/US2022/075330—ISA/EPO—dated Dec. 6, 2022.
(Continued)

*Primary Examiner* — Thai Nguyen
(74) *Attorney, Agent, or Firm* — Holland & Hart / Qualcomm

(57) ABSTRACT

Methods, systems, and devices for wireless communications are described. In some wireless communications systems, a user equipment (UE) may utilize opportunistic cooperative relaying to support exchanging packets between UEs without establishing or maintaining beamforming alignment between the UEs. Specifically, a source UE may invite nearby UEs (e.g., helper UEs) that receive a sidelink transmission (e.g., a packet meant for a different destination UE) to perform a single frequency network (SFN)-type transmission to opportunistically relay the packet to the destination UE. The helper UEs may receive, decode, and transmit the sidelink signaling from the source UE without establishing or configuring a relay agreement with the source UE. The destination UE may receive the sidelink signaling via cascading, SFN-type transmissions by one or more helper UEs. The destination UE may respond to the sidelink signaling with feedback information via one or more helper UEs or directly to the source UE.

29 Claims, 14 Drawing Sheets

(51) Int. Cl.
*H04W 16/28* (2009.01)
*H04W 72/0453* (2023.01)
*H04W 72/044* (2023.01)

(58) Field of Classification Search
CPC ..... H04W 92/18; H04W 88/04; H04W 8/005;
H04W 72/121; H04W 76/40; H04L
5/0053; H04L 1/1685; H04L 2001/0097;
H04L 5/00
See application file for complete search history.

(56) References Cited

U.S. PATENT DOCUMENTS

| | | |
|---|---|---|
| 2020/0275412 A1* | 8/2020 | Kim .................... H04B 7/06954 |
| 2021/0099269 A1 | 4/2021 | Wu et al. |
| 2021/0127404 A1 | 4/2021 | Ryu et al. |
| 2021/0315057 A1* | 10/2021 | Baek ...................... H04W 76/10 |
| 2022/0338092 A1* | 10/2022 | Wang .................... H04W 92/18 |

OTHER PUBLICATIONS

LG Electronics: "Solution on Relay for Public Safety ProSe", SA WG2 Meeting S2#98, S2-132614_P-CR_23703_RELAY_V3, 3rd Generation Partnership Project, Mobile Competence Centre, 650, Route Des Lucioles, F-06921 Sophia-Antipolis Cedex, France, vol. SA WG2, No. Valencia, Spain, Jul. 15, 2013-Jul. 19, 2013, Jul. 9, 2013, XP050725994, 6 pages.

* cited by examiner

OPPORTUNISTIC COOPERATIVE RELAYING OF SIDELINK SIGNALS

FIELD OF TECHNOLOGY

The following relates to wireless communications, including opportunistic cooperative relaying of sidelink signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, sidelink communications may be utilized for signaling different types of information between UEs, such as exchanging safety related messages in vehicle-to-everything (V2X) systems. While some sidelink messages may utilize sub-6 gigahertz (GHz) licensed bands, other messages (e.g., messages related to public safety) may be communicated in bandwidths corresponding to 6 GHz and 60 GHz unlicensed bands, among others. When operating in the 6 GHz and 60 GHz range, some UEs may perform beamforming alignment to compensate for potentially large propagation losses. However, beamforming alignment may be a resource intensive procedure, especially for NR sidelink communications. For example, beamforming alignment may involve multiple channel access procedures, may consume a significant amount of radio resources, and may suffer from non-trivial latency. However, a UE transmitting sidelink messages without beamforming alignment may suffer from relatively poor communication reliability due to the lack of beamforming alignment between UEs.

SUMMARY

The described techniques relate to improved methods, systems, devices, and apparatuses that support opportunistic cooperative relaying of sidelink signals. Generally, the described techniques provide for performing high-efficiency opportunistic cooperative relaying for sidelink messages to improve sidelink communication reliability for user equipment (UEs) without establishing or maintaining beamforming alignment between the UEs. The opportunistic cooperative relaying of sidelink signaling may significantly improve communication reliability by leveraging qualified, nearby UEs to propagate one or more messages from a source UE to a destination UE. Specifically, the source UE may invite nearby UEs (e.g., helper UEs) that receive a sidelink transmission (e.g., a transmission meant for the destination UE) to perform single frequency network (SFN)-type transmissions to relay the sidelink transmission to the destination UE. The helper UEs may refrain from establishing a configured relay agreement with the source UE and instead may determine, on-the-fly, to perform the opportunistic relaying based on receiving the sidelink transmission.

Opportunistic cooperative relaying may be utilized to successfully transmit a message from the source UE to the destination UE via cascading retransmissions by one or more helper UEs without configuration of relay relationships between UEs. By relaying the sidelink signaling in SFN-type transmissions, multiple helper UEs may relay the signaling in shared resources—which may correspond to a resource pool for opportunistic cooperative relaying—without causing destructive interference to the signaling. The SFN-type transmissions may efficiently utilize resources and may allow multiple UEs to cooperate in opportunistically relaying sidelink signaling in shared resources. Additionally or alternatively, the source UE may request feedback from the destination UE, one or more helper UEs, or both to determine whether the sidelink signaling is successfully received by the destination UE, is being relayed by one or more helper UEs, or both. Utilizing opportunistic cooperative relaying may enable the source UE to communicate sidelink signaling with the destination UE while refraining from performing beamforming alignment procedures, which may decrease signaling overhead and decrease latency for sidelink communications without negatively affecting communication reliability.

A method for wireless communications at a first UE is described. The method may include transmitting sidelink signaling indicating a request for one or more additional UEs to opportunistically relay the sidelink signaling in a resource configured for single frequency network-type transmission and receiving feedback signaling including a positive acknowledgment for the sidelink signaling based on the request for the one or more additional UEs to opportunistically relay the sidelink signaling.

An apparatus for wireless communications at a first UE is described. The apparatus may include a processor, memory coupled with the processor, and instructions stored in the memory. The instructions may be executable by the processor to cause the apparatus to transmit sidelink signaling indicating a request for one or more additional UEs to opportunistically relay the sidelink signaling in a resource configured for single frequency network-type transmission and receive feedback signaling including a positive acknowledgment for the sidelink signaling based on the request for the one or more additional UEs to opportunistically relay the sidelink signaling.

Another apparatus for wireless communications at a first UE is described. The apparatus may include means for transmitting sidelink signaling indicating a request for one or more additional UEs to opportunistically relay the sidelink signaling in a resource configured for single frequency network-type transmission and means for receiving feedback signaling including a positive acknowledgment for the sidelink signaling based on the request for the one or more additional UEs to opportunistically relay the sidelink signaling.

A non-transitory computer-readable medium storing code for wireless communications at a first UE is described. The code may include instructions executable by a processor to transmit sidelink signaling indicating a request for one or more additional UEs to opportunistically relay the sidelink signaling in a resource configured for single frequency network-type transmission and receive feedback signaling including a positive acknowledgment for the sidelink signaling based on the request for the one or more additional UEs to opportunistically relay the sidelink signaling.

Some examples of the method, apparatuses, and non-transitory computer-readable medium described herein may further include operations, features, means, or instructions for retransmitting the sidelink signaling in the resource configured for single frequency network-type transmission based on the request.

In some examples of the method, apparatuses, and non-transitory computer-readable medium described herein, the retransmitted sidelink signaling indicates a second request for the one or more additional UEs to opportunistically relay the sidelink signaling in a second resource configured for single frequency network-type transmission.

In some examples of the method, apparatuses, and non-transitory computer-readable medium described herein, the retransmitted sidelink signaling refrains from indicating a second request for the one or more additional UEs to opportunistically relay the sidelink signaling.

Some examples of the method, apparatuses, and non-transitory computer-readable medium described herein may further include operations, features, means, or instructions for setting a destination identifier of the sidelink signaling to indicate a group identifier, the one or more additional UEs corresponding to the group identifier.

In some examples of the method, apparatuses, and non-transitory computer-readable medium described herein, an association between the group identifier and the one or more additional UEs may be defined at the first UE, configured by a system information block, configured by a radio resource control signal, or any combination thereof.

Some examples of the method, apparatuses, and non-transitory computer-readable medium described herein may further include operations, features, means, or instructions for performing a beam sweeping procedure, where the sidelink signaling may be transmitted using a set of multiple beams based on the beam sweeping procedure.

In some examples of the method, apparatuses, and non-transitory computer-readable medium described herein, the sidelink signaling requests feedback from the one or more additional UEs to indicate which UEs of the one or more additional UEs opportunistically relay the sidelink signaling in the resource configured for single frequency network-type transmission, and the feedback signaling may be received from a second UE of the one or more additional UEs, the feedback signaling acknowledging that the second UE received the sidelink signaling and may be opportunistically relaying the sidelink signaling in the resource configured for single frequency network-type transmission.

Some examples of the method, apparatuses, and non-transitory computer-readable medium described herein may further include operations, features, means, or instructions for monitoring for second feedback signaling from a third UE in a feedback resource corresponding to the resource configured for single frequency network-type transmission based on receiving the feedback signaling acknowledging that the second UE received the sidelink signaling and may be opportunistically relaying the sidelink signaling in the resource configured for single frequency network-type transmission, where the sidelink signaling may be intended for the third UE.

In some examples of the method, apparatuses, and non-transitory computer-readable medium described herein, the sidelink signaling may be intended for a third UE and requests feedback from the third UE, and the feedback signaling may be received from the third UE in a unicast transmission.

Some examples of the method, apparatuses, and non-transitory computer-readable medium described herein may further include operations, features, means, or instructions for terminating a beam sweeping procedure based on receiving the feedback signaling from the third UE prior to completion of the beam sweeping procedure.

In some examples of the method, apparatuses, and non-transitory computer-readable medium described herein, the sidelink signaling comprises a groupcast transmission, a broadcast transmission, or both and is transmitted to a plurality of UEs.

In some examples of the method, apparatuses, and non-transitory computer-readable medium described herein, the sidelink signaling may be intended for a third UE and requests feedback from a second UE of the one or more additional UEs with an established sidelink connection with the third UE and the feedback signaling may be received from the second UE of the one or more additional UEs, the feedback signaling acknowledging that the second UE received the sidelink signaling and may be opportunistically relaying the sidelink signaling in the resource configured for single frequency network-type transmission using the established sidelink connection with the third UE.

In some examples of the method, apparatuses, and non-transitory computer-readable medium described herein, the sidelink signaling includes sidelink control information, and the sidelink control information includes a control element indicating the request for the one or more additional UEs to opportunistically relay the sidelink signaling.

A method for wireless communications at a second UE is described. The method may include receiving, from a first UE, first sidelink signaling indicating a request for one or more additional UEs to opportunistically relay the first sidelink signaling in a resource configured for single frequency network-type transmission, generating second sidelink signaling corresponding to the first sidelink signaling based on the request, and transmitting the second sidelink signaling in the resource configured for single frequency network-type transmission based on the generating.

An apparatus for wireless communications at a second UE is described. The apparatus may include a processor, memory coupled with the processor, and instructions stored in the memory. The instructions may be executable by the processor to cause the apparatus to receive, from a first UE, first sidelink signaling indicating a request for one or more additional UEs to opportunistically relay the first sidelink signaling in a resource configured for single frequency network-type transmission, generate second sidelink signaling corresponding to the first sidelink signaling based on the request, and transmit the second sidelink signaling in the resource configured for single frequency network-type transmission based on the generating.

Another apparatus for wireless communications at a second UE is described. The apparatus may include means for receiving, from a first UE, first sidelink signaling indicating a request for one or more additional UEs to opportunistically relay the first sidelink signaling in a resource configured for single frequency network-type transmission, means for generating second sidelink signaling corresponding to the first sidelink signaling based on the request, and means for transmitting the second sidelink signaling in the resource configured for single frequency network-type transmission based on the generating.

A non-transitory computer-readable medium storing code for wireless communications at a second UE is described. The code may include instructions executable by a processor to receive, from a first UE, first sidelink signaling indicating a request for one or more additional UEs to opportunistically relay the first sidelink signaling in a resource configured for single frequency network-type transmission, generate second sidelink signaling corresponding to the first sidelink signaling based on the request, and transmit the second sidelink signaling in the resource configured for single frequency network-type transmission based on the generating.

Some examples of the method, apparatuses, and non-transitory computer-readable medium described herein may further include operations, features, means, or instructions for determining a group of UEs associated with the request based on a group identifier indicated by the first sidelink signaling and determining to transmit the second sidelink signaling based on the group of UEs including the second UE.

Some examples of the method, apparatuses, and non-transitory computer-readable medium described herein may further include operations, features, means, or instructions for decoding a data portion of the first sidelink signaling based on the group of UEs including the second UE, where the second sidelink signaling may be generated to include the data portion based on the decoding.

Some examples of the method, apparatuses, and non-transitory computer-readable medium described herein may further include operations, features, means, or instructions for determining to transmit the second sidelink signaling further based on a source identifier indicated by the first sidelink signaling, a destination identifier indicated by the first sidelink signaling, a zone identifier indicated by the first sidelink signaling, the first UE corresponding to a parent node of the second UE, the destination identifier associated with a third UE corresponding to a child node of the second UE, or any combination thereof.

Some examples of the method, apparatuses, and non-transitory computer-readable medium described herein may further include operations, features, means, or instructions for determining to transmit the second sidelink signaling further based on a qualification rule for operating as an opportunistic relay for the first UE, where the qualification rule may be defined at the second UE, configured by a system information block, configured by a radio resource control signal, configured by sidelink control information, or any combination thereof.

Some examples of the method, apparatuses, and non-transitory computer-readable medium described herein may further include operations, features, means, or instructions for determining to opportunistically relay the first sidelink signaling based on receiving the first sidelink signaling and based on the request, where opportunistically relaying the first sidelink signaling includes the transmitting the second sidelink signaling without an established agreement for the second UE to relay signaling for the first UE.

In some examples of the method, apparatuses, and non-transitory computer-readable medium described herein, generating the second sidelink signaling may include operations, features, means, or instructions for setting a source identifier of the second sidelink signaling to an identifier of the first UE.

Some examples of the method, apparatuses, and non-transitory computer-readable medium described herein may further include operations, features, means, or instructions for determining a proxy identifier indicated by the first sidelink signaling. In some examples of the method, apparatuses, and non-transitory computer-readable medium described herein, generating the second sidelink signaling may include operations, features, means, or instructions for setting a source identifier of the second sidelink signaling to the proxy identifier.

In some examples of the method, apparatuses, and non-transitory computer-readable medium described herein, generating the second sidelink signaling may include operations, features, means, or instructions for setting a bit indicating that the second sidelink signaling may be a single frequency network-type transmission.

In some examples of the method, apparatuses, and non-transitory computer-readable medium described herein, the first sidelink signaling includes a reservation field indicating one or more resources from a resource pool supporting opportunistic relaying of sidelink signals, the one or more resources including at least the resource configured for single frequency network-type transmission.

Some examples of the method, apparatuses, and non-transitory computer-readable medium described herein may further include operations, features, means, or instructions for receiving control signaling configuring the resource pool supporting the opportunistic relaying of sidelink signals.

In some examples of the method, apparatuses, and non-transitory computer-readable medium described herein, the first sidelink signaling includes stage-two sidelink control information, a medium access control element, or both including the reservation field.

In some examples of the method, apparatuses, and non-transitory computer-readable medium described herein, the one or more resources include a second resource configured for single frequency network-type transmission and the second sidelink signaling may be transmitted using a first communication beam in the resource configured for single frequency network-type transmission and the method, apparatuses, and non-transitory computer-readable medium may include further operations, features, means, or instructions for retransmitting the second sidelink signaling using a second communication beam different from the first communication beam in the second resource configured for single frequency network-type transmission.

Some examples of the method, apparatuses, and non-transitory computer-readable medium described herein may further include operations, features, means, or instructions for receiving, from a third UE, third sidelink signaling indicating a second request for a second one or more additional UEs to opportunistically relay the third sidelink signaling in a second resource configured for single frequency network-type transmission, detecting fourth sidelink signaling preempting the second resource configured for single frequency network-type transmission, and refraining from transmitting fifth sidelink signaling corresponding to the third sidelink signaling in the second resource configured for single frequency network-type transmission based on the detecting.

In some examples of the method, apparatuses, and non-transitory computer-readable medium described herein, the first sidelink signaling includes sidelink control information, and the sidelink control information includes a control element indicating the request for the one or more additional UEs to opportunistically relay the first sidelink signaling.

DETAILED DESCRIPTION

Figure 1:
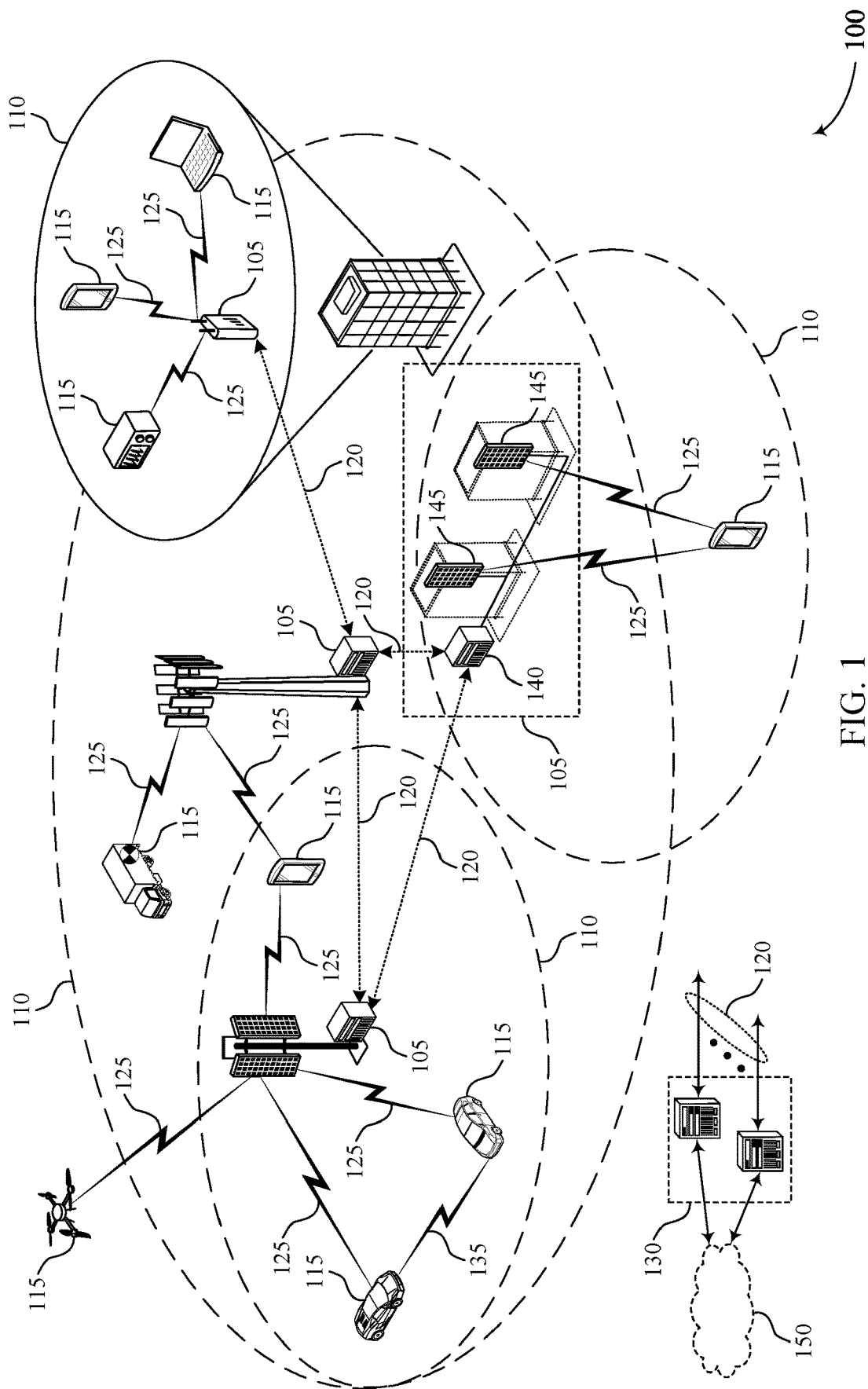
FIGS. 1 and 2 illustrate examples of wireless communications systems that support opportunistic cooperative relaying of sidelink signals in accordance with aspects of the present disclosure.

In some wireless communications systems, such as New Radio (NR) systems, wireless devices may utilize sidelink communications for signaling information between user equipment (UEs). For example, UEs (e.g., smart vehicles, among other wireless devices) may exchange safety related messages in a vehicle-to-everything (V2X) system. In some cases, wireless devices communicating over sidelink may utilize new vertical domains (e.g., for public safety) which may correspond to bandwidths between 6 gigahertz (GHz) and 60 GHz (e.g., unlicensed bands). When operating between 6 GHz and 60 GHz, UEs may utilize beamforming techniques (e.g., beam alignment to compensate for potentially large propagation losses over a threshold) to increase signaling throughput and reduce latency. For example, a source UE may perform beam sweeping and may establish beam alignment with a destination UE. Upon establishing beam alignment for a sidelink connection, the source UE may transmit information to the destination UE using beamformed communications over the beam-aligned sidelink connection. However, beamforming alignment may be a resource intensive procedure, especially for NR sidelink communications (e.g., for safety messages between many vehicles in a V2X system). For example, beamforming alignment may involve multiple channel access procedures, may consume a significant amount of radio resources (e.g., over a resource threshold), and may suffer from non-trivial latency (e.g., over a threshold latency). In some examples (e.g., for sidelink messages configured for relatively low latency communications), UEs may transmit sidelink messages without performing beamforming alignment to reduce signaling overhead and latency associated with the beamforming alignment procedures. However, if beamforming alignment between UEs is not obtained, sidelink communications between the UEs may suffer from relatively poor signal reliability.

In some wireless communications systems, UEs may exchange information over sidelink channels via opportunistic cooperative relays. Specifically, if a source UE transmits sidelink signaling to a destination UE, one or more other UEs (e.g., secondary or helper UEs) may receive the sidelink signaling. If the source UE includes a request for opportunistic relaying of the sidelink signaling (e.g., in the sidelink signaling), one or more helper UEs may opportunistically decode the sidelink signaling and transmit the sidelink signaling to the destination UE, other helper UEs, or both via a single frequency network (SFN)-type transmission. That is, the helper UEs may act as relays between the source UE and the destination UE, where information may be exchanged between the source UE and the destination UE without establishing or maintaining beamforming alignment between the source UE and the destination UE and without configuring an established relay relationship between the helper UEs and the source UE.

In some cases, the source UE may request opportunistic cooperative relaying via a unicast transmission towards the destination UE. In some other cases, the source UE may request opportunistic cooperative relaying for a groupcast or broadcast transmission. Additionally or alternatively, the source UE may request a positive acknowledgment (ACK)/negative acknowledgment (NACK) response from the destination UE. In some examples, beam sweeping at the source UE may terminate after receiving an ACK associated with sidelink signaling relayed via opportunistic cooperative relays. In some cases, a helper UE may correspond to a super helper UE (e.g., a helper UE with a relatively high probability of a successful connection to the destination UE, for example, due to currently configured beam alignment between the super helper UE and the destination UE). In some such cases, the source UE may request an ACK/NACK response from the super helper UE indicating a successful transmission to the destination UE, as the super helper UE may be assumed to have a guaranteed connection to the destination UE. Utilizing opportunistic cooperative relays may enable the source UE to communicate sidelink signaling with the destination UE without performing beamforming alignment procedures while also maintaining or increasing signaling reliability, which may decrease signaling overhead, decrease latency, and increase overall UE efficiency.

Aspects of the disclosure are initially described in the context of wireless communications systems. Aspects of the disclosure are further illustrated by resource diagrams, a relay system, and a process flow. Aspects of the disclosure are further illustrated by and described with reference to apparatus diagrams, system diagrams, and flowcharts that relate to opportunistic cooperative relaying of sidelink signals.

FIG. 1 illustrates an example of a wireless communications system 100 that supports opportunistic cooperative relaying of sidelink signals in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI- RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems 100 (e.g., 5G NR communications systems or other systems), sidelink may be utilized for V2X communications, which may support an exchange of messages (e.g., safety-related messages or other messages) between nearby UEs, for example, over sub-6 GHz licensed bands. Sidelink operations may support two radio resource allocations (e.g., two channel access modes). Mode 1 may correspond to in-coverage deployments, where a sidelink UE 115 receives grants from a base station 105 for channel access. Mode 2 may correspond to autonomous deployment, where sidelink UEs 115 utilize sensing to perform distributed channel access. In some examples, such as in 5G NR, sidelink may support broadcast communications, groupcast communications, unicast communications, or a combination thereof. Additionally or alternatively, a UE 115 transmitting a sidelink message may request feedback for the sidelink message (e.g., an ACK/NACK response for a unicast transmission, a NACK-only or ACK/NACK response for a groupcast transmission).

Sidelink channel access may involve a physical sidelink control channel (PSCCH) coupled with a physical sidelink shared channel (PSSCH) occupying at least one subchannel and carrying one transport block (TB) of data. The PSCCH may carry stage-one sidelink control information (SCI), which may indicate radio resource occupancy as well as set-ups for PSSCH decoding. The PSSCH may carry stage-two SCI and data, where the stage-two SCI may include control information such as a Layer 1 (L1) source identifier (ID), an L1 destination ID, a request for HARQ responses, or a combination thereof.

Some wireless communications systems 100, such as those utilizing 5G NR technology or other radio access technologies (RATs), may use sidelink communications in specific bandwidths to support the communication of specific information (e.g., information related to public safety). In some such cases, the sidelink communications may not correspond to sub-6 GHz licensed bands. However, the sidelink communications may utilize bandwidths associated with 6 GHz or 60 GHz unlicensed bands. In some cases, beamforming alignment may be performed in higher frequency bands (e.g., millimeter wave (mmWave) bands, 6 GHz bands, 60 GHz bands) to compensate for significant propagation losses (e.g., greater propagation losses relative to propagation losses in sub-6 GHz bands). While propagation losses over the 6 GHz unlicensed band may be relatively low, transmission power limits (e.g., due to regulations) may result in relatively poor communication reliability unless beamforming alignment procedures are performed between UEs 115 communicating over sidelink.

In some cases, sidelink communication protocols or procedures in specific bands (e.g., 6 GHz to 60 GHz bands) may further increase a resource burden associated with beamforming alignment for sidelink (e.g., especially in NR sidelink). For example, UEs 115 may not use standalone reference signals, such as channel state information-reference signals (CSI-RS) or sounding reference signals (SRS) in Uu, in sidelink operations. Consequently, beamforming alignment may involve multiple channel accesses, which may consume a significant amount of radio resources corresponding to signaling overhead and result in non-trivial latency before UEs 115 achieve beamforming alignment.

In some cases, however, high-efficiency flooding (e.g., opportunistic cooperative relaying) of sidelink signals using SFN-type transmissions may be utilized for sporadically exchanging packets between a pair of UEs 115 without establishing or maintaining beamforming alignment. Utilizing opportunistic cooperative relaying may enable a pair of UEs 115 to communicate sidelink signaling without performing beamforming alignment procedures via one or more other UEs 115 (e.g., helper UEs 115) relaying the signaling in specific resources for SFN-type transmissions, which may improve communication reliability, decrease signaling overhead, and decrease signaling latency for sidelink communications.

Figure 2:
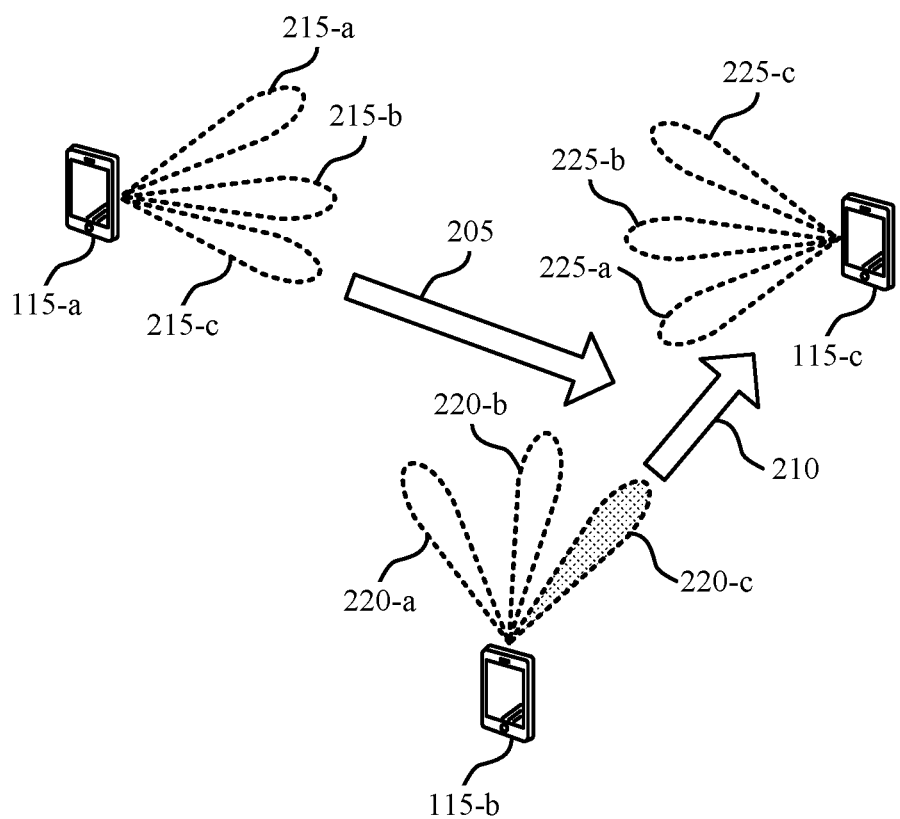

FIG. 2 illustrates an example of a wireless communications system 200 that supports opportunistic cooperative relaying of sidelink signals in accordance with aspects of the present disclosure. The wireless communications system 200 may implement or be implemented by one or more aspects of the wireless communications system 100. For example, the wireless communications system 200 may include a UE 115-a, a UE 115-b, and a UE 115-c, which may be examples of the UE 115 as described with reference to FIG. 1. In some examples, the UE 115-a, the UE 115-b, and the UE 115-c may perform communications over sidelink. Specifically, the UE 115-a, the UE 115-b, and the UE 115-c may utilize opportunistic cooperative relaying to exchange information over sidelink channels, for example, without performing beam alignment procedures or configuring dedicated relay devices. It should be noted that, while examples are discussed below, any number of devices and device types may perform techniques described in the present disclosure.

The UE 115-a, the UE 115-b, and the UE 115-c may operate in an environment in which sidelink communications are used to communicate information directly between UEs 115. For example, the UEs 115 may be examples of vehicles in a V2X system and may exchange V2X information (e.g., public safety information, directional or positional information, or any other information between vehicles). Due to a relatively high rate of messaging coupled with often dense urban environments for V2X communications, the UEs 115-a, 115-b, and 115-c may utilize opportunistic cooperative relaying to exchange information over sidelink without performing beam alignment procedures.

For example, the UE 115-a (e.g., operating as a source UE) may determine to transmit information to the UE 115-c (e.g., a destination UE for the source UE's transmission). The information for transmission may be associated with one or more quality-of-service (QoS) parameters. In some cases, a source UE may perform a beam alignment procedure to establish beamformed communications via a communication link with a destination UE. For example, the source UE may utilize a set of beams (e.g., a beam 215-a, a beam 215-b, and a beam 215-c) to perform beam sweeping and determine a transmit beam for transmission to the destination UE. Similarly, the destination UE may test multiple beams (e.g., a beam 225-a, a beam 225-b, and a beam 225-c) to determine a receive beam for receiving messages from the source UE. However, in some examples, performing beam alignment, maintaining beam alignment, or both may involve a significant signaling overhead (e.g., over a threshold), a significant latency (e.g., beyond a latency threshold), or both. For example, if the source and destination UEs are vehicles, the beams to use for communications may change rapidly based on the mobility of the UEs, resulting in inefficient beam alignments. Accordingly, to reduce power consumption, processing overhead, signaling overhead, and latency, some UEs 115 may refrain from performing beam alignment for sidelink communications. Additionally or alternatively, a beam alignment procedure may fail. For example, the beam alignment procedure may indicate or result in relatively low signaling reliability (e.g., below a threshold reliability metric). To improve communication reliability if beam alignment fails or is not performed, the source UE 115-a may determine to utilize opportunistic cooperative relaying via SFN-type transmissions to flood information to the destination UE 115-c.

The source UE 115-a, upon determining to utilize opportunistic cooperative relaying, may transmit sidelink signaling 205 indicating a request inviting one or more additional UEs to opportunistically relay information to a destination UE 115-c (e.g., one destination UE 115-c for unicast transmissions or multiple destination UEs 115 for groupcast or multicast transmissions). For example, a UE 115-b (e.g., a helper UE) may successfully receive the sidelink signaling 205 transmitted by the source UE 115-c that was intended for the UE 115-c. Based on the sidelink signaling 205 and the indication of a request for opportunistic cooperative relaying, the helper UE 115-b may transmit the information as sidelink signaling 210, via an SFN-type transmission, to the destination UE 115-c, other helper UEs 115, or both. Opportunistic relaying may involve the UE 115-c determining to relay the sidelink signaling 205 on-the-fly, for example, without a defined agreement to relay information for the UE 115-a. In some cases, the UE 115-b may opportunistically act as a relay for multiple different UEs 115 concurrently. Similarly, the UE 115-b may determine not to relay information for UEs 115, such as the UE 115-a, based on the UE 115-b not being configured to relay information for the UE 115-a. Cooperative relaying may involve multiple UEs 115 relaying (or being allowed to relay) the sidelink signaling 205 in shared resources (e.g., SFN-type resources). In some examples, the helper UE 115-b may relay the sidelink signaling 210 using a beam sweeping procedure, for example, using a beam 220-a, a beam 220-b, and a beam 220-c. In some other examples, such as in the wireless communications system 200, the helper UE 115-b may transmit the sidelink signaling 210 to the destination UE 115-c via the beam 220-c. It should be noted that, while UEs 115-a, 115-b, and 115-c may be referred to as the source UE, the helper UE, and the destination UE, any of the UEs 115-a, 115-b, and 115-c may act as a source UE, helper UE, or destination UE for a given sidelink transmission.

In some examples, the helper UE 115-b may perform an SFN-type transmission to opportunistically flood the information to the destination UE 115-c over one or more beams 220-a, 220-b, or 220-c. That is, helper UEs 115 may utilize a single frequency channel (e.g., set of frequency resources) to relay the sidelink signaling 210. For example, the source UE 115-a may invite any nearby helper UEs 115 to perform SFN-type transmissions on one or more sub-channels in one or more symbols, slots, or other time resources, which may be specified by a pool of resources associated with opportunistic cooperative relaying. In some cases, if the helper UE 115-b opportunistically relays the sidelink signaling 210 to other helper UEs 115, the helper UE 115-b may request that the other helper UEs 115 also perform SFN-type transmissions in subsequent SFN resources to opportunistically flood the sidelink signaling 210 to yet other UEs 115. In some examples, helper UEs 115 may perform a cascade of opportunistic relays, which may result in the destination UE 115-c receiving the information after multiple opportunistic relays, where the destination UE 115-*c* may not have received the information otherwise (e.g., due to blocking, atmospheric attenuation, or other factors).

In some cases, the helper UEs 115 may utilize a common frequency for SFN-type transmissions. In some other cases, the helper UEs 115 may utilize a set of frequencies from a resource pool for SFN-type transmissions. The source UE 115-*a*, the helper UEs 115, or both may use one or more specific control elements to enable helper UEs that correctly receive sidelink signaling 205 to construct identical PSCCH information, PSSCH information, or both that may be transmitted in SFN-type transmissions. For example, a control element may indicate a request for opportunistic cooperative relaying of a sidelink message. Additionally or alternatively, the control element may indicate one or more parameters or criteria for helper UEs 115 to use to determine whether to relay the sidelink message. In some examples, helper UEs 115 may perform self-qualification associated with the sidelink signaling 205 to determine whether the specific UE 115 qualifies to relay the sidelink signaling 205 in the SFN-type transmission, which may be performed according to rules in a system information block (SIB), rules configured at the UE 115, rules indicated by RRC signaling, or a combination thereof.

In some cases, cascading opportunistic relaying may result in a broadcasting storm. For example, if a relatively large quantity of helper UEs 115 (e.g., greater than a threshold quantity) receive the sidelink signaling 205 and transmit sidelink signaling 210 that interferes with the signaling from the other helper UEs 115, the opportunistic relaying may result in increased interference, network congestion, and latency. To mitigate a potential broadcasting storm, the helper UEs 115 may perform the SFN-type transmissions to control the cascade of information (e.g., flooding) within a specific set of resources such that the multiple relayed signals may be constructive. Additionally or alternatively, helper UEs 115 may use parameters or rules to determine whether to relay sidelink signaling 205, reducing the quantity of nearby UEs 115 that may relay sidelink signaling 205 from the source UE 115-*a*.

The source UE 115-*a* (e.g., while performing beam-sweeping transmissions due to an absence of beamforming alignment) may utilize a multi-ACK mechanism to terminate beam-sweeping transmissions early. That is, the destination UE 115-*c*, one or more helper UEs 115, or both may indicate to the source UE 115-*a* that the destination UE 115-*c* received the sidelink signaling 205. Based on the indication that the destination UE 115-*c* received the information, the source UE 115-*a* may cease beam sweeping.

By leveraging opportunistic cooperative relays, the source UE 115-*a* may transmit information to the destination UE 115-*c* without beam alignment between the UE 115-*a* and the UE 115-*c* and without establishing a configured relay device for the UE 115-*a*. That is, no one-to-one pre-agreement among the source UE 115-*a*, the destination UE 115-*c*, and the helper UE 115-*b* may be present for relaying signaling, which may lower signaling overhead and lower latency involved in successfully communicating sidelink signaling 205.

Figure 3:
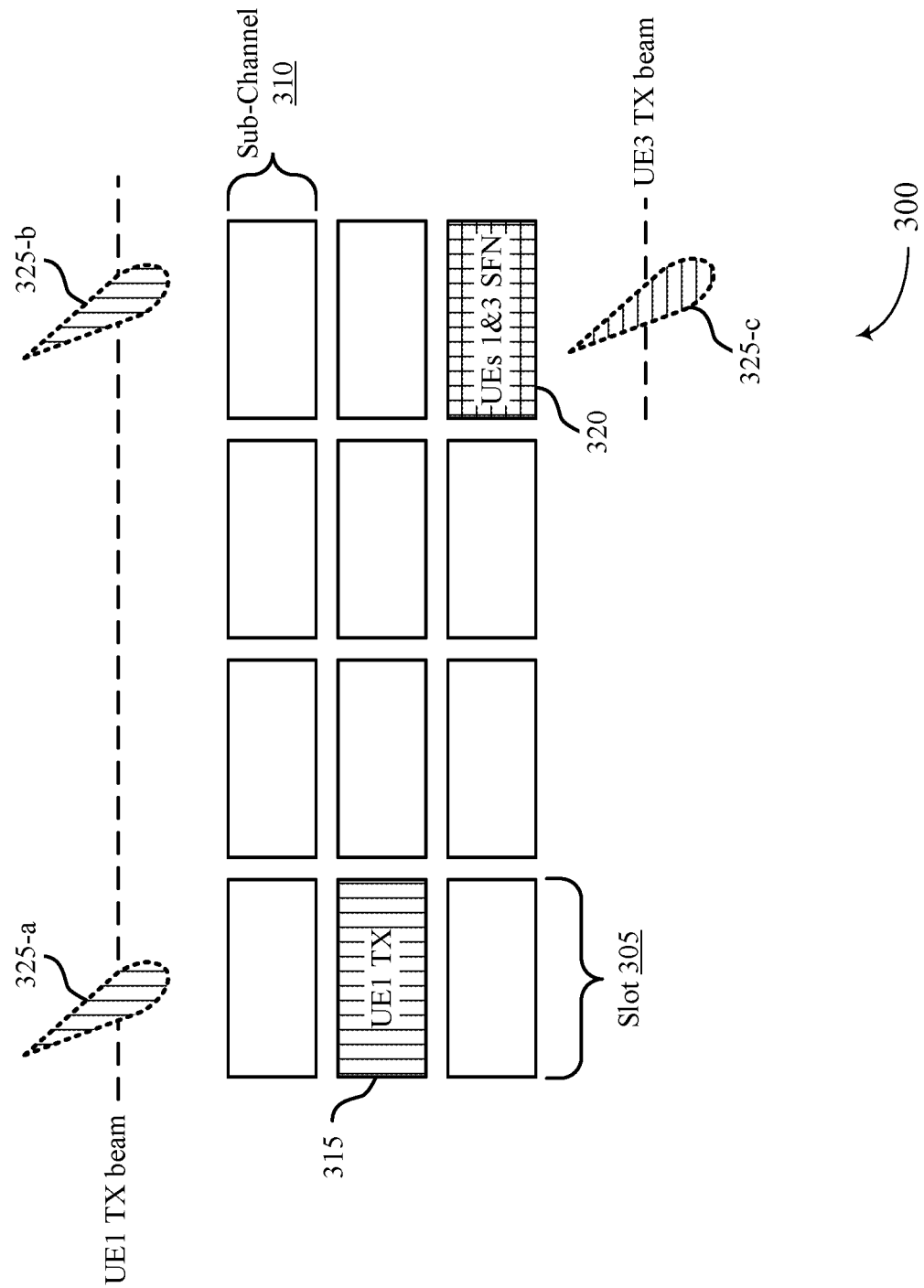
FIG. 3 illustrates an example of a set of resources that support opportunistic cooperative relaying of sidelink signals in accordance with aspects of the present disclosure.

FIG. 3 illustrates an example of a set of resources 300 that support opportunistic cooperative relaying of sidelink signals in accordance with aspects of the present disclosure. The set of resources 300 may include one or more aspects of the wireless communications system 100 and the wireless communications system 200. For example, the set of resources 300 may correspond to communications between one or more UEs 115 (e.g., a source UE, one or more helper UEs, a destination UE), which may be examples of the UEs 115 as described with reference to FIGS. 1 and 2. It should be noted that, while examples are discussed below, any number of devices and device types may be used to perform techniques described herein.

To support opportunistic cooperative relaying in sidelink, one or more UEs 115 may receive sidelink signaling including control signaling (e.g., stage-one SCI, stage-two SCI) which enables a UE 115 that receives and decodes the control signaling to reconstruct the received PSCCH information, PSSCH information, or both for the sidelink signaling. The UE 115 may determine to decode the PSSCH portion of the sidelink signaling and generate the sidelink signaling based on a request in the control signaling (e.g., in the PSCCH portion) for one or more UEs 115 to relay the sidelink signaling. The UE 115 (e.g., acting as a helper UE) may transmit the generated sidelink signaling in an SFN-type transmission in one or more configured resources within the set of resources 300 (e.g., in a specific sub-channel 310, in a specific slot 305, or in any other specific frequency resource, time resource, spatial resource, or combination thereof).

The source UE 115 may transmit the sidelink signaling using one or more beams (e.g., during a beam sweeping procedure), where the sidelink signaling may include a request for opportunistic cooperative relaying. For example, the source UE 115 may transmit the sidelink signaling using a first beam 325-*a* in a resource 315. The resource 315 may correspond to a specific symbol, slot 305, sub-slot, sub-frame, or any other set of time resources. Additionally, the resource 315 may correspond to a specific resource block (RB), set of RBs, sub-channel 310, channel, or any other set of frequency resources.

The sidelink signaling may indicate another resource 320 for the opportunistic cooperative relaying. The other resource 320 may support SFN-type transmissions. In some cases, the other resource 320 may be selected from a pool of resources for opportunistic cooperative relaying (e.g., a pool of resources supporting SFN-type transmissions by one or more helper UEs 115, retransmission by the source UE 115, or both). One or more helper UEs 115 receiving the sidelink signaling in the resource 315 may perform SFN-type transmissions in the resource 320 (e.g., a resource indicated in the sidelink signaling or selected from a resource pool by a helper UE 115) to perform opportunistic cooperative relaying. For example, the source UE 115, the helper UEs 115, or both may utilize one or more techniques to schedule, or otherwise indicate, reservations for the aforementioned SFN-type transmissions.

In some examples, SFN-type transmissions from helper UEs 115 may carry one bit to indicate being an SFN-type transmission to assist other UEs 115 (e.g., helper UEs 115, a destination UE 115) to differentiate between normal transmissions and SFN-type transmissions. In some cases, the source UE 115 may transmit sidelink signaling over a PSCCH, a PSSCH, or both as a unicast transmission towards the destination UE 115. The sidelink signaling may include one bit in SCI (e.g., stage-one SCI) to call for opportunistic cooperative relaying, which may also indicate a request to use SFN-type transmissions for the relaying. For example, if the bit is set to a first bit value (e.g., 0), the sidelink signaling may not call for opportunistic cooperative relaying, but if the bit is set to a second value (e.g., 1), the sidelink signaling may call for opportunistic cooperative relaying.

In some cases, UEs 115 may use rules (e.g., configured over or using parameters from Layer 3 (L3)) to determine which UEs 115 are triggered by the bit to perform opportunistic cooperative relaying. For example, a UE 115 receiving the sidelink signaling may use one or more L3 parameters—or other parameters—to determine whether to decode and relay the sidelink signaling. A rule may specify that if a sidelink message received by a UE 115 requests opportunistic cooperative relaying (e.g., using the one-bit indication) and the sidelink message satisfies one or more L3 parameters for the UE 115, the UE 115 may determine to relay the sidelink message. The rules may be UE-specific, UE group-specific, or common across UEs. The L3 parameters may include a source ID of the sidelink signaling, where a helper UE 115 may relay sidelink message for a specific sender (or original sender) indicated by the source ID of an information packet (e.g., sidelink signaling). Additionally or alternatively, the L3 parameters may include a destination ID corresponding to a target for an information packet, where a helper UE 115 may relay a sidelink message if the sidelink message indicates the specific destination ID. The destination ID may assist the helper UE 115 in relaying the packet by allowing the helper UE 115 to target the relayed transmission towards the destination UE 115. Additionally or alternatively, the L3 parameters may indicate a zone ID, direct parent nodes, direct child nodes, or a combination thereof. A zone ID may indicate a zone (e.g., a geographic area) to a helper UE 115, and the helper UE 115 may relay the information packet if the helper UE 115 is currently located within the zone when the information packet is received. One or more direct parent nodes may be assigned to a helper UE 115, and the helper UE 115 may relay information packets received from a direct parent node. Similarly, one or more direct child nodes may be assigned to a helper UE 115, and the helper UE 115 may relay information packets targeted towards a direct child node. A UE 115 may be configured with any quantity of rules based on any combination of L3 parameters or other parameters defining whether a UE 115 should opportunistically and cooperatively relay sidelink signaling.

In some cases, a UE 115 communicating over sidelink may perform overhearing to discover and identify other UEs 115 within a given proximity (e.g., within a threshold range). Based on performing overhearing, one or more UEs 115 may act as helper UEs 115, which may perform opportunistic cooperative relaying in support of a detected source UE 115, a detected destination UE 115, or both.

Upon receiving sidelink signaling in the resource 315 and determining to relay the signaling (e.g., based on a one-bit request indicator, based on one or more rules), a helper UE 115 may perform an SFN-type transmission in the resource 320. The helper UE 115 may transmit the sidelink signaling in the resource 320 using a specific beam 325-*c* or a set of beams (e.g., in a beam sweep). The SFN-type transmission of the sidelink signaling may indicate the sidelink data as well as an identifier which may be used by the destination UE 115 to determine the source UE 115 (e.g., the original source UE) associated with the sidelink signaling. That is, the helper UE 115 may transmit the sidelink signaling received from the source UE 115 such that the destination UE 115 may receive the sidelink signaling from the helper UE 115 while identifying the source UE 115 originating the sidelink signaling. For example, in constructing a PSCCH portion, a PSSCH portion, or both for the SFN-type transmission of the sidelink signaling, a helper UE may determine (e.g., be instructed by one or more control elements, rules, or configurations) to set an L1 source ID for the transmission to that of the source UE 115 (e.g., instead of or in addition to an L1 ID representing the helper UE 115). By doing so, the destination UE 115 may receive the PSCCH portion, the PSSCH portion, or both and identify the originator of the sidelink signaling as if the signaling was received directly from the source UE 115.

In some examples, the source UE 115 may utilize a PSCCH reservation field to indicate up to a threshold quantity of (e.g., two) sub-channels 310 for SFN-type transmissions in future time resources within the set of resources 300. A helper UE 115 receiving the PSCCH may determine similar transmission setups (e.g., transmission power and beamforming parameters) for transmitting in the reserved sub-channels 310. The similar transmission setups may support other sensing UEs to predict availability of the reserved sub-channels 310. For example, a sensing UE 115 (e.g., a prospective helper UE 115) may predict availability of the reserved sub-channel 310 based on a reference signal receive power (RSRP) measurement associated with a demodulation reference signal (DMRS) for the reserved sub-channel 310 and based on the transmission setup. Utilizing the aforementioned techniques to predict availability of the reserved sub-channel 310, a sensing UE 115 may determine an availability, a payload, or both corresponding to PSCCH reservations in one or more sub-channels 310. For example, the sensing UE 115 may determine a PSCCH reservation to be an SFN-type one reservation, which may correspond to a group of helper UEs 115 performing flooding (e.g., opportunistic cooperative relaying) in support of a source UE 115 and a destination UE 115. The sensing UE 115 may determine that the SFN-type one reservation may correspond to a flooding group ID, a flooding SCI indication bit, or both. Based on determining the PSCCH reservation, the sensing UE 115 may utilize a relatively low RSRP threshold to detect whether resources associated with the reserved sub-channel 310 are available (e.g., to reduce the probability of collision in such resources).

Additionally or alternatively, the source UE 115 may specify in one or more control elements a proxy ID for SFN-type transmissions. The proxy ID may be configured at the source UE 115, configured via a SIB or RRC message, selected by the source UE 115, or some combination thereof. Helper UEs 115 may indicate the proxy ID in the source field for relayed sidelink signaling. The destination UE 115 may reply to the proxy ID associated with an opportunistic cooperative relayed message received from a helper UE (e.g., in a feedback message). Based on the destination UE 115 replying to the proxy ID (e.g., indicating the proxy ID as the destination for feedback), the source UE 115 receiving the feedback may identify both that the reply from the destination UE 115 is addressed to the source UE 115 (e.g., via the proxy ID) and that one or more packets (e.g., sidelink information) were delivered to the destination UE 115 via an SFN-type transmission (e.g., via relaying by one or more helper UEs 115). In some cases, the proxy ID may identify to which SFN-type transmission the information corresponds (e.g., if different proxy IDs are assigned to different SFN-type transmissions).

In some cases, the source UE 115 may provide additional information to assist with compatibility with UEs 115 that do not support opportunistic cooperative relaying (e.g., for improved sensing). The source UE 115 may assign one or more control elements indicating future resources (e.g., sub-channels 310, slots 305) for SFN-type transmissions, for example, in a stage-two SCI or MAC-CE. The same encoding used in other reservations in PSCCH information may be used to provide up to a threshold number (e.g., two) of future resources (e.g., sub-channels 310, slots 305) for SFN-type transmissions. In some examples, when including an indication of two future SFN-type transmission occasions using a legacy reservation encoding method, there may be two options available to the source UE 115, the helper UEs 115, or both for performing the two SFN-type transmissions.

For example, the source UE 115 may request opportunistic cooperative relaying from surrounding helper UEs 115 using a single set of resources (e.g., a resource 315). The request may be sent in an initial transmission, where surrounding helper UEs 115 may receive and decode the initial transmission. That is, the initial transmission may be sent to multiple helper UEs 115 without initial relaying. Hence, by utilizing the initial transmission to communicate with multiple nearby helper UEs 115, the source UE 115 may utilize a relatively small resource footprint for sidelink signaling.

Conversely, the request may be carried by a first SFN-type transmission. Some helper UEs 115 may receive the first SFN-type transmission and subsequently join a second SFN-type transmission. That is, a first set of helper UEs 115 may receive the first SFN-type transmission and subsequently retransmit the information included in the first SFN-type transmission over a second SFN-type transmission. Additionally, UEs may transmit with different beams over respective SFN-type transmission occasions. As the first SFN-type transmission and the second SFN-type transmission may occupy different resources, the total set of SFN-type transmissions may occupy a relatively larger footprint within resources assigned to SFN-type transmissions (e.g., multiple SFN-type transmission resource may be utilized). In some cases, the source UE 115 may retransmit the sidelink signaling using the SFN-type transmission and indicated resource 320 for opportunistic cooperative relaying. For example, the source UE 115 may retransmit the sidelink signaling using a beam 325-b in the resource 320 with one or more helper UEs 115.

In some examples, such as when operating in mode 2 sidelink, a helper UE 115 may be configured to perform a $T_3$-ahead re-evaluation before performing an SFN-type transmission. For example, the helper UE may participate in SFN-type transmissions if the helper UE determines that a resource has not been preempted by other higher priority reservations. By allowing helper UEs to evaluate reservations and backoff if a resource 320 is preempted by a high priority transmission (e.g., satisfying a priority or latency requirement threshold), the system may reduce collisions and support flexible scheduling for high-priority, low-latency signals.

Figure 4:
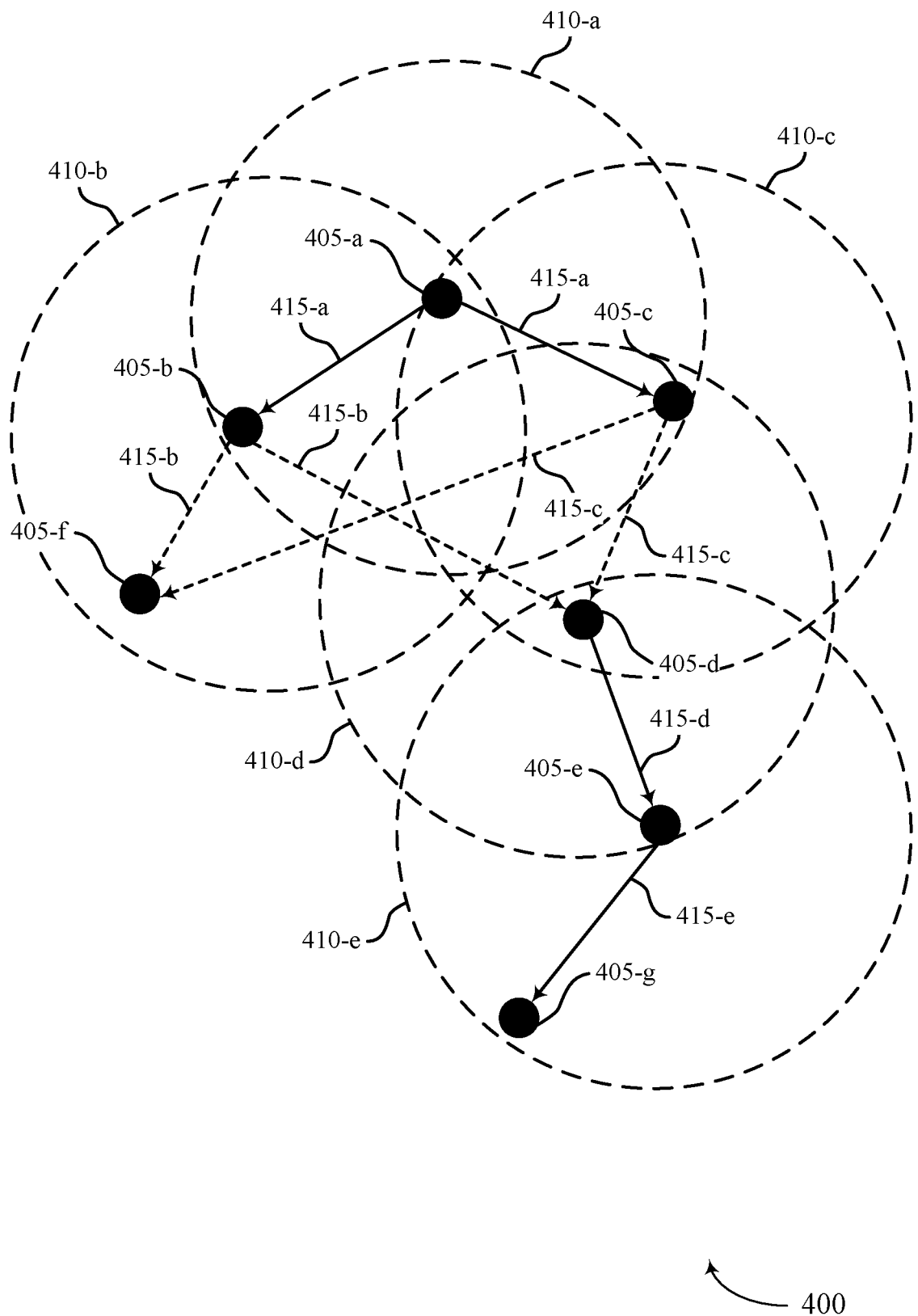
FIG. 4 illustrates an example of a relay system that supports opportunistic cooperative relaying of sidelink signals in accordance with aspects of the present disclosure.

FIG. 4 illustrates an example of a relay system 400 that supports opportunistic cooperative relaying of sidelink signals in accordance with aspects of the present disclosure. The relay system 400 may be implemented by one or more aspects of the wireless communications system 100 and the wireless communications system 200. For example, the relay system 400 may correspond to communications between a source UE, one or more helper UEs, and a destination UE, as described with reference to FIG. 2. It should be noted that, while examples are discussed below, any number of devices and device types may be used to perform techniques described in the present disclosure. Additionally, any UE may operate as a source UE, a helper UE, or a destination UE on a per opportunistic cooperative relay basis.

The source UE 405-a may determine that an available data path to transmit information to the destination UE 405-g is through sidelink relay, which may correspond to a standalone or out-of-coverage mode 2 sidelink cluster. In some examples, the determination may occur in mode 1 sidelink when the source UE 405-a does not have adequate information to address (e.g., over Uu signaling) the destination UE 405-g. Assuming relatively higher-frequency deployment, some sidelink UEs 115 may not have performed beam alignment procedures. However, there may be information packets to be transmitted from the source UE 405-a to the destination UE 405-g. For example, an application of the source UE 405-a may schedule resources to send a direct communication request (e.g., a high-layer signaling to initiate unicast) to the destination UE 405-g without beamforming alignment. In some cases, the source UE 405-a may transmit a coordination message to initiate beamforming alignment with the destination UE 405-g to establish a unicast connection later (e.g., assuming an internet connection). In yet other cases, however, the source UE 405-a may determine to send an urgent data packet, even if beam alignment may not be complete or supported. In some cases, the source UE 405-a may determine, via overhearing, there are nearby UEs 405 (e.g., potential helper UEs) from whom it may request opportunistic cooperative relaying (e.g., flooding) to transmit the urgent data packet without performing beam alignment.

FIG. 4 illustrates flooding of SFN-type transmissions from a source UE 405-a, through one or more helper UEs 405, to a destination UE 405-g. Specifically, the relay system 400 supports a source UE 405-a communicating with a destination UE 405-g utilizing multiple helper UEs 405 as intermediaries. The relay system 400 also supports an exemplary signaling order, which may correspond to a flooding arrangement (e.g., via SFN-type transmissions). Flooding may support multi-hop transmissions and may be especially useful for delivering sporadic packets with low latency. Accordingly, flooding may be useful for sidelink transmissions (e.g., V2X communications), because flooding enables the source UE, helper UEs, and the destination UE(s) to refrain from performing beam alignment procedures, relay configuration procedures, or both.

As discussed herein with reference to FIG. 2, flooding may potentially lead to a broadcasting storm. To reduce the risk of a broadcasting storm, a node (e.g., a helper UE 405) may determine whether to participate in flooding (e.g., opportunistic cooperative relaying) according to an associated probability. A helper UE 405 may receive an SFN-type transmission, which may indicate a source UE 405-a as well as a destination UE 405-g. The helper UE 405 may perform an SFN-type retransmission based on a probability associated with the SFN-type transmission. For example, the helper UE 405 may utilize a random number generator to generate a pseudo-random number (e.g., between 0 and 1). The helper UE 405 may compare the pseudo-random number to one or more thresholds, where satisfying the threshold (e.g., probability) may trigger the helper UE 405 to perform the SFN-type retransmission. By utilizing a probability, some helper UEs 405 may refrain from performing SFN-type retransmissions, which may mitigate broadcasting storm occurrences. Additionally or alternatively, a helper UE 405 may receive a time-to-live for a flooding instance. For example, if the helper UE 405 receives an SFN-type transmission, the helper UE 405 may perform SFN-type retransmissions for a given amount of time (e.g., 40 milliseconds (ms)).

In some examples, to better control broadcasting storms, as well as to save power resources at helper UEs 405, gating information as defined rules can be carried in SIB, carried in RRC signaling, or configured at the helper UEs 405. The gating information may indicate a set of helper UEs 405 that are qualified to participate in SFN-type transmissions. In some cases, the rules may correspond to a threshold signal metric for a reference signal (e.g., RSRP for a DMRS)

measured by a helper UE 405 for a transmission by the source UE 405-*a*. A helper UE 405 may participate in relaying if the measured channel metric satisfies a threshold (e.g., a measured RSRP value is smaller than a defined threshold, indicating the helper UE 405 is far enough away from the source UE 405-*a* to add value by relaying sidelink signaling). This inter-UE distance-oriented rule may be additionally or alternatively specified via location information like zone IDs in V2X (e.g., a helper UE 405 may participate in flooding if the helper UE 405 is within a different zone than the source UE 405).

Another technique for mitigating broadcasting storms may use a threshold on channel metrics (e.g., DMRS RSRP) measured for previous transmissions from the destination UE 405-*g*. A helper UE 405 may participate in flooding if a measured channel metric corresponding to previous transmissions from the destination UE 405-*g* satisfies a threshold (e.g., a measured RSRP metric is greater than a threshold, indicating the helper UE 405 is relatively close to the destination UE 405-*g*). A helper UE 405 satisfying the threshold (or a different threshold) may be qualified as a "super" helper UE 405, which is discussed in further detail with reference to FIG. 5. The aforementioned rules, which may be specified in SCI to indicate qualifying helper UEs, may lead to different relay groups, where a helper UE 405 may be qualified in multiple relay groups.

The relay system 400 depicts an example flooding scenario using SFN-type transmissions as well as one or more measures to control flooding (e.g., to mitigate broadcasting storms). The source UE 405-*a* may perform a first transmission 415-*a* corresponding to beam sweeping, the first transmission 415-*a* carrying sidelink signaling including a request to perform opportunistic cooperative relaying for communicating the sidelink signaling to the destination UE 405-*g*. In a specific example, a helper UE 405-*b* and a helper UE 405-*c* may detect the sidelink signaling from the beam sweeping performed by the source UE 405-*a*. In some cases, the helper UEs 405-*b* and 405-*c* may utilize one or more techniques to control relaying (e.g., flooding) to subsequent helper UEs 405, the destination UE 405-*g*, or both. For example, the helper UE 405-*b* may compare a generated pseudo-random number (e.g., 0.9) to a threshold, such as 0.6, to determine whether to retransmit the received sidelink signaling. Based on the pseudo-random number, the helper UE 405-*b* may perform transmissions 415-*b* of the sidelink signaling. Likewise, the helper UE 405-*c* may generate a pseudo-random number to compare with the threshold used by the helper UE 405-*b*, or a different threshold. In this example, both the helper UE 405-*b* and the helper UE 405-*c* may determine to perform retransmissions of the information packet received via sidelink signaling from the source UE 405-*a*. The helper UE 405-*c* may perform SFN-type transmissions 415-*c* for the sidelink signaling.

Based on determining to perform retransmissions, the helper UEs 405-*b* and 405-*c* may perform retransmissions of the sidelink signaling to a helper UE 405-*d* and a helper UE 405-*f*, for example, in a single resource for SFN-type relaying or in multiple different resources for SFN-type relaying. Additionally or alternatively, the source UE 405-*a*, the helper UEs 405-*b* and 405-*c*, or some combination thereof may determine to perform SFN-type transmissions for opportunistic relaying using groupcast transmissions, broadcast transmissions, or both. For example, the helper UEs 405-*b* and 405-*c* may perform SFN-manner relaying to one or more additional UEs 405, the destination UE 405-*g*, or both. In some examples, one or more helper UEs 405 may receive the broadcast transmission, groupcast transmission, or both from a UE 405, and the one or more helper UEs 405 may determine whether to perform additional opportunistic relaying via groupcast, broadcast, or both to yet other UEs 405. In some such examples, helper UEs 405 may perform a series of cascading broadcast transmissions, groupcast transmissions, or both to flood information to the destination UE 405-*g*. In some examples, the helper UEs 405-*b* and 405-*c* may perform SFN-manner groupcast, broadcast, or both based on a set of transmission beams to be used for retransmissions, which may be indicated by the source UE 405-*a*. In some other cases, the helper UEs 405-*b* and 405-*c* may perform unicast retransmissions to other UEs 405, the destination UE 405-*g*, or both. In some cases, UEs 405 within a threshold range from a transmitting UE 405 may detect a groupcast or broadcast transmission. For example, UEs 405-*b* and 405-*c* within range 410-*a* of the source UE 405-*a* may detect, receive, and decode groupcast or broadcast sidelink signaling from the source UE 405-*a*. The helper UE 405-*b* may support a range 410-*b*, the helper UE 405-*c* may support a range 410-*c*, the helper UE 405-*d* may support a range 410-*d*, and the helper UE 405-*e* may support a range 410-*e*.

FIG. 4 illustrates the helper UE 405-*b* performing an SFN-type transmission to the helper UE 405-*d*, and the helper UE 405-*c* performing an SFN-type transmission to the helper UE 405-*d*. By performing SFN-type transmissions at the helper UEs 405-*b* and 405-*c*, the second hop (e.g., the first retransmission by helper UEs 405 after the initial transmission by the source UE 405-*a*) may reduce resource usage and improve reliability (e.g., due to supporting multiple communication paths).

The helper UEs 405-*d* and 405-*f* may receive the first transmission 415-*b* from the helper UE 405-*b*, the second transmission 415-*c* from the helper UE 405-*c*, or both. Based on receiving a transmission, the helper UEs 405-*d* and 405-*f* may determine whether to perform relaying similar to the helper UEs 405-*b* and 405-*c* (e.g., if the opportunistic cooperative relaying supports multi-hop relaying). In some cases, the helper UE 405-*f* may determine to refrain from transmitting the sidelink signaling in an SFN-type transmission. The helper UE 405-*d*, however, may determine to perform a transmission 415-*d* of the sidelink signaling to the helper UE 405-*e*. The helper UE 405-*e* may receive the transmission 415-*d* including the information packet and an associated intended destination (e.g., the destination UE 405-*g*). The helper UE 405-*e* may perform one or more techniques to determine whether to transmit the information packet. In this example, the helper UE 405-*e* may determine to transmit the information packet for the sidelink signaling via an SFN-type transmission 415-*e* to the destination UE 405-*g*.

In some examples, transmissions by helper UEs 405 may be determined based on a flooding group (e.g., relay group). For each transmission, the source UE 405-*a* may transmit PSCCH information, PSSCH information, or both towards the destination UE 405-*g* via a flooding group determined by the source UE 405-*a*, configured at the source UE 405-*a*, or specified in SIB, RRC, or some other configuration signaling. While sidelink communications may be managed in an application layer, UEs 405 may utilize lower layer grouping for relaying information packets via opportunistic cooperative relaying.

For example, the source UE 405-*a* may transmit a groupcast transmission including an information packet in sidelink signaling with an L2 destination ID set to a relay group ID. In some examples, sidelink UEs 405 (e.g., helper UEs 405) may continue to process (e.g., demodulate, decode) PSCCH information, PSSCH information, or both based on the relay group. In some cases, the PSCCH information, PSSCH information, or both may also include a separate field to carry the L2 ID of the destination UE 405-g. After receiving the PSCCH information, PSSCH information, or both indicating a relay group, any UE 405 that is capable (e.g., or qualified) in the relay group (e.g., either as the destination UE 405-g or a helper UE 405) may proceed to decode the PSSCH information, PSCCH information, or both to determine the data and other control elements included in the sidelink signaling.

Based on the relay group, the destination UE 405-g may receive the information packet of the sidelink signaling. In some examples, the destination UE 405-g may transmit feedback information (e.g., an ACK/NACK response) to the source UE 405-a. Upon receiving the feedback from the destination UE 405-g, the source UE 405-a may determine whether the destination UE 405-g successfully received the sidelink signaling. If the destination UE 405-g received the sidelink signaling, the source UE 405 may cease beam sweeping procedures performed in order to communicate with the destination UE 405-g. Additionally or alternatively, helper UEs 405 may cease opportunistic cooperative relaying corresponding to the information packet sent from the source UE 405-a to the destination UE 405-g.

Figure 5:
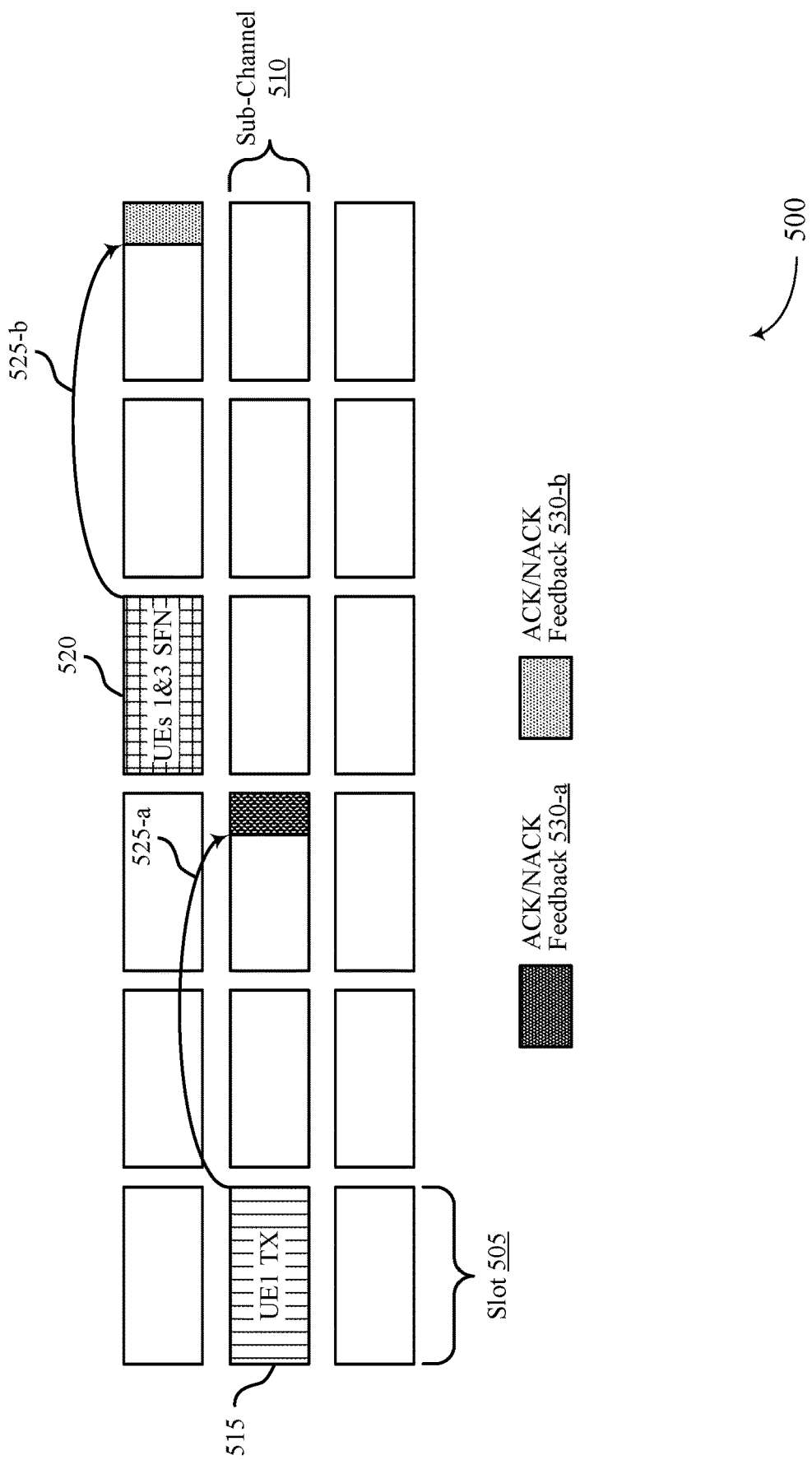
FIG. 5 illustrates an example of a set of resources that support opportunistic cooperative relaying of sidelink signals in accordance with aspects of the present disclosure.

FIG. 5 illustrates an example of a set of resources 500 that support opportunistic cooperative relaying of sidelink signals in accordance with aspects of the present disclosure. The set of resources 500 may be implemented by one or more aspects of the wireless communications system 100 and the wireless communications system 200. For example, the set of resources 500 may correspond to communications between a source UE, one or more helper UEs, and one or more destination UEs, as described with reference to FIGS. 2 through 4.

The set of resources 500 may be used for a transmission from a source UE 115 within a slot 505 and a sub-channel 510. The source UE 115, as in previous examples, may overhear nearby UEs 115, where the source UE 115 may determine to request (e.g., via beam sweeping or otherwise) opportunistic cooperative relaying to a destination UE 115 via one or more nearby UEs 115 (e.g., helper UEs 115). In some examples, such as those depicted in FIG. 5, the source UE 115 may request feedback 530 (e.g., an ACK/NACK response) from helper UEs 115, the destination UE 115, or a combination thereof.

Specifically, after the sidelink signaling is relayed through one or more helper UEs 115 via opportunistic cooperative relaying, the destination UE 115 may receive the transmission, which may include an ACK/NACK request. For example, the source UE 115 may transmit the sidelink signaling in a resource 515. One or more helper UEs 115 may detect, receive, and decode the sidelink signaling from the resource 515 and may determine to relay the sidelink signaling in a resource 520 (e.g., a resource configured for SFN-type transmissions). In some examples, the source UE 115 may also retransmit the sidelink signaling in the resource 520. The destination UE 115 may receive the sidelink signaling in the resource 520. In some examples, the destination UE 115 may send feedback 530-b in a unicast transmission. For example, the destination UE 115 may transmit an ACK/NACK response (e.g., feedback 530-b) in a given slot 505 and sub-channel 510 via unicast transmission to the source UE 115. In some cases, the destination UE 115 may determine a resource for providing the feedback 530-b based on a timing indication 525-b for turning around feedback 530. The destination UE 115 may transmit an ACK response to the source UE 115 via unicast transmission if the destination UE 115 successfully receives the sidelink signaling. Based on the received ACK response, in some cases, the source UE 115 may cease beam sweeping operations, cease retransmissions of the sidelink signaling, or both. If a NACK is received (or no feedback 530-b is received) by the source UE 115 in the resource for feedback from the destination UE 115, the source UE 115 may utilize the NACK response as an indicator to perform retransmission (e.g., using a same transmission beam or same beam sweeping arrangement).

Additionally or alternatively, the source UE 115 may request an ACK-only response from helper UEs 115 for an initial transmission (e.g., in the resource 515). Specifically, the source UE 115 may include an ACK-only offset $M_{FLOOD,ACK}$, which may be provided via a SIB, defined at the UE 115, an RRC signal, or a combination thereof. The timing indication 525-a may represent the ACK-only offset $M_{FLOOD,ACK}$. If a helper UE 115 receives the initial transmission, the helper UE 115 may transmit an ACK response (e.g., ACK feedback 530-a) to the source UE 115. The helper UE 115, along with any other helper UEs 115 that receive the initial transmission, may send ACK responses over a specified physical sidelink feedback channel (PSFCH) resource. For example, a helper UE 115 may use a specified PSFCH resource according to Equation 1:

$$(K+M_{FLOOD,ACK}) \bmod (Z*Y) \tag{1}$$

where K is an L1 sidelink ID of the source UE, Z is a number of physical resource block (PRB) resources of PSFCH allocated, and Y is a number of cyclic shifts (e.g., Y and Z may be per-sub-channel configurations). Based on the specified PSFCH resource, the helper UE 115 may transmit an ACK response (e.g., ACK feedback 530-a) to the source UE 115. If the source UE 115 detects a signal in the resource for ACK feedback 530-a, the source UE 115 may determine that at least one helper UE 115 is relaying the sidelink signaling (e.g., without determining how many or which specific helper UEs 115 responded with ACK feedback 530-a). Such an ACK response may indicate that there is at least one helper UE 115 that is participating in opportunistic cooperative relaying and, as a result, there is a possibility to get an ACK response from the destination UE 115 due to the arranged cascading transmissions (e.g., via SFN-type transmissions).

For example, after receiving the ACK feedback 530-a from the helper UE 115, the source UE 115 may monitor for the ACK/NACK feedback 530-b from the destination UE 115 in resources corresponding to feedback to the SFN-type transmission resources (e.g., the resource 520) for opportunistic cooperative relaying. The source UE 115 may monitor for feedback transmitted over the PSFCH resources corresponding to an SFN-type transmission, even if the destination UE 115 does not participate in that specific SFN-type transmission (e.g., in the resource 520). If beam sweeping is being performed at the source UE 115, the source UE 115 may cease beam sweeping after receiving an ACK response from the destination UE 115.

Additionally or alternatively, the source UE 115 may request a separate ACK response from a "super" helper UE 115, where the super helper UE 115 is assumed to have a connection with the destination UE 115. For example, the source UE 115 may assume a super helper UE 115 will successfully relay sidelink signaling to the destination UE 115 due to a measured channel metric between the super helper UE 115 and the destination UE 115, the super helper UE 115 and the destination UE 115 being located within a threshold distance from one another, the super helper UE 115 maintaining an established sidelink connection with the destination UE 115, or some combination thereof. A separate ACK-only offset $M_{FLOOD,BM}$ may be provided in SIB, may be defined at the UE 115, may be configured by RRC signaling, or any combination thereof for super helper UEs 115. If the source UE 115 receives the separate ACK response from the super helper UE 115, the source UE 115 may assume the destination UE 115 received the information packet (e.g., via the super helper UE 115) and may subsequently terminate beam sweeping (if currently performing beam sweeping). The source UE 115 may support any combination of feedback configurations for helper UEs 115, super helper UEs 115, destination UEs 115, or any combination thereof.

Figure 6:
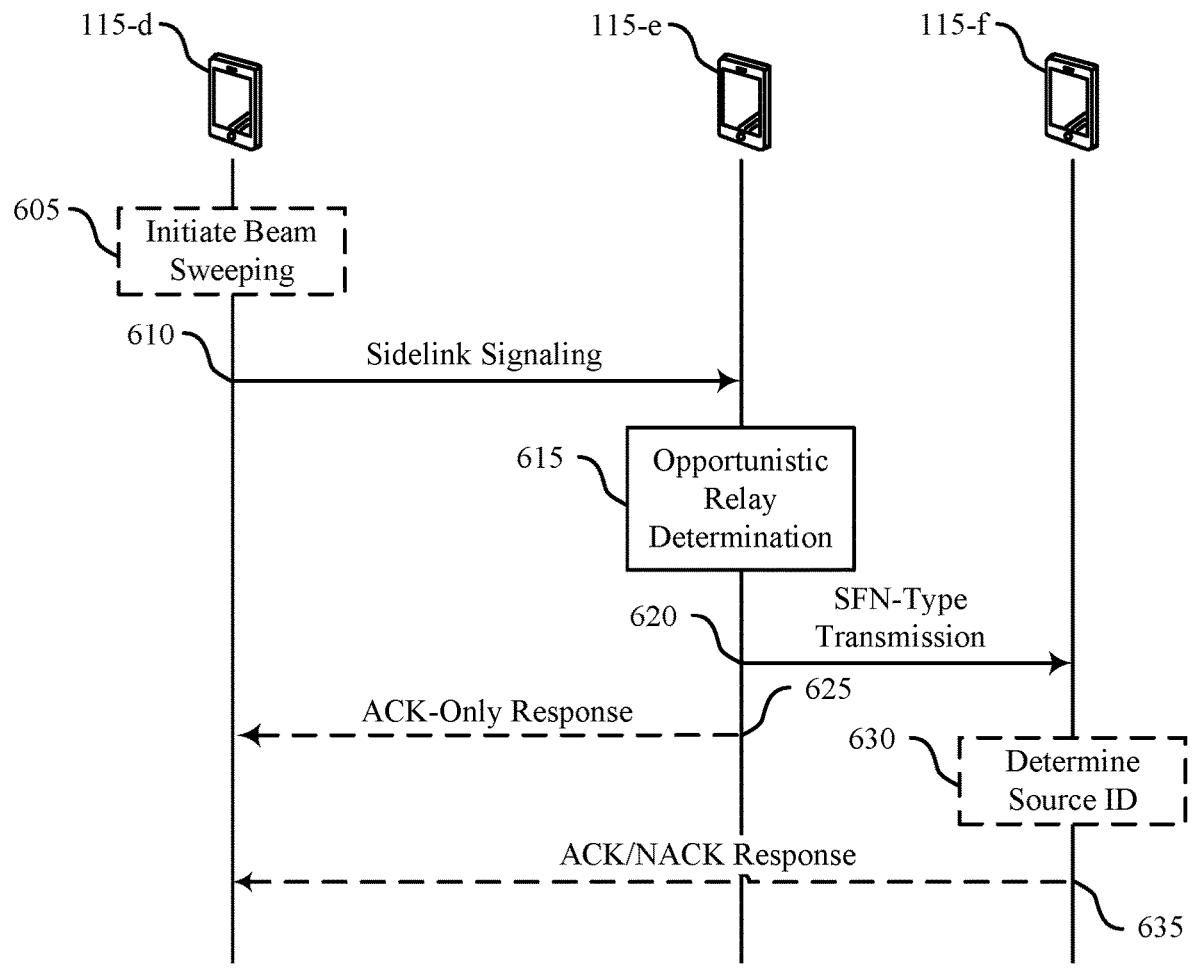
FIG. 6 illustrates an example of a process flow that supports opportunistic cooperative relaying of sidelink signals in accordance with aspects of the present disclosure.

FIG. 6 illustrates an example of a process flow 600 that supports opportunistic cooperative relaying of sidelink signals in accordance with aspects of the present disclosure. The process flow 600 may be implemented by one or more aspects of the wireless communications system 100 and the wireless communications system 200. For example, the process flow 600 may correspond to communications between a UE 115-d, a UE 115-e, and a UE 115-f, which may be examples of the UEs 115 as described with reference to FIGS. 1 through 5. It should be noted that, while examples are discussed below, any number of devices and device types may be used to perform operations described in the present disclosure. In the following description of the process flow 600, operations between the UEs 115-d, 115-e, and 115-f may occur in a different order or at different times than as shown. Additionally, any of the UEs 115-d, 115-e, and 115-f may operate as helper UE, a source UE, or a destination UE on a per-opportunistic cooperative relay request basis. Some operations may also be omitted from the process flow 600 and other operations may be added to the process flow 600.

At 605, the UE 115-d (e.g., operating as a source UE) may initiate beam sweeping based on determining one or more UEs 115 are within a given proximity for opportunistic cooperative relaying. For example, the source UE 115-d may determine that the UE 115-e (e.g., a potential helper UE) is nearby (e.g., within a threshold distance) and may be utilized to cascade information from the source UE 115-d to a destination UE 115-f.

At 610, the source UE 115-d may transmit sidelink signaling with a relay request and information for the destination UE 115-f. In some cases, UE 115-d may transmit the sidelink signaling as part of the beam sweeping procedure. A UE 115-e may receive the sidelink signaling and determine whether to opportunistically relay the sidelink signaling. The sidelink signaling may include a request to relay the information to the UE 115-f (e.g., the destination UE), a source ID corresponding to the source UE 115-d, and a destination ID corresponding to the destination UE 115-f. Additionally or alternatively, the sidelink signaling may include one or more indications to perform SFN-type transmissions during opportunistic relaying. In some cases, the sidelink signaling may include a request for an ACK/NACK response from the destination UE 115-f, an ACK-only response from the helper UE 115-e, an ACK response from a super helper UE 115-e, or a combination thereof.

At 615, the helper UE 115-e may perform a relay determination. For example, the helper UE 115-e may determine whether to opportunistically relay information included in the sidelink signaling based on the relay request to further helper UEs 115, the destination UE 115-f, or a combination thereof. The helper UE may use rules, parameters, thresholds, a time-to-live, or some combination thereof to determine whether to relay the sidelink signaling in a resource configured for an SFN-type transmission.

At 620, the helper UE 115-e may perform an SFN-type transmission to relay the information from the source UE 115-d to the destination UE 115-f based on the determination (e.g., based on determining to opportunistically and cooperatively relay the sidelink signaling). The UE 115-e may generate the sidelink signaling for relaying to include an indication of a source ID corresponding to the source UE 115-d (e.g., rather than—or in addition to—indicating the helper UE 115-e as the source of the transmission).

In some examples, at 625, based on whether the source UE 115-d requested an ACK-only response from helper UEs 115-e upon successful receipt of the relay request at 610, successful relaying of the sidelink signaling at 620, or both, the helper UE 115-e may transmit an ACK-only response to the source UE 115-d.

At 630, the destination UE 115-f may determine a source ID associated with the SFN-type transmission received from the helper UE 115-e. In some cases, the destination UE 115-f may also determine the source UE 115-d requested an ACK/NACK response corresponding to the relayed information. In some such cases, at 635, the destination UE 115-f may transmit an ACK/NACK response to the source UE 115-d (e.g., directly or via one or more relays). For example, the destination UE 115-f may determine a successful receipt of the relayed information and, based on the source ID and the request for an ACK/NACK response, transmit an ACK response to the source UE 115-d.

Figure 7:
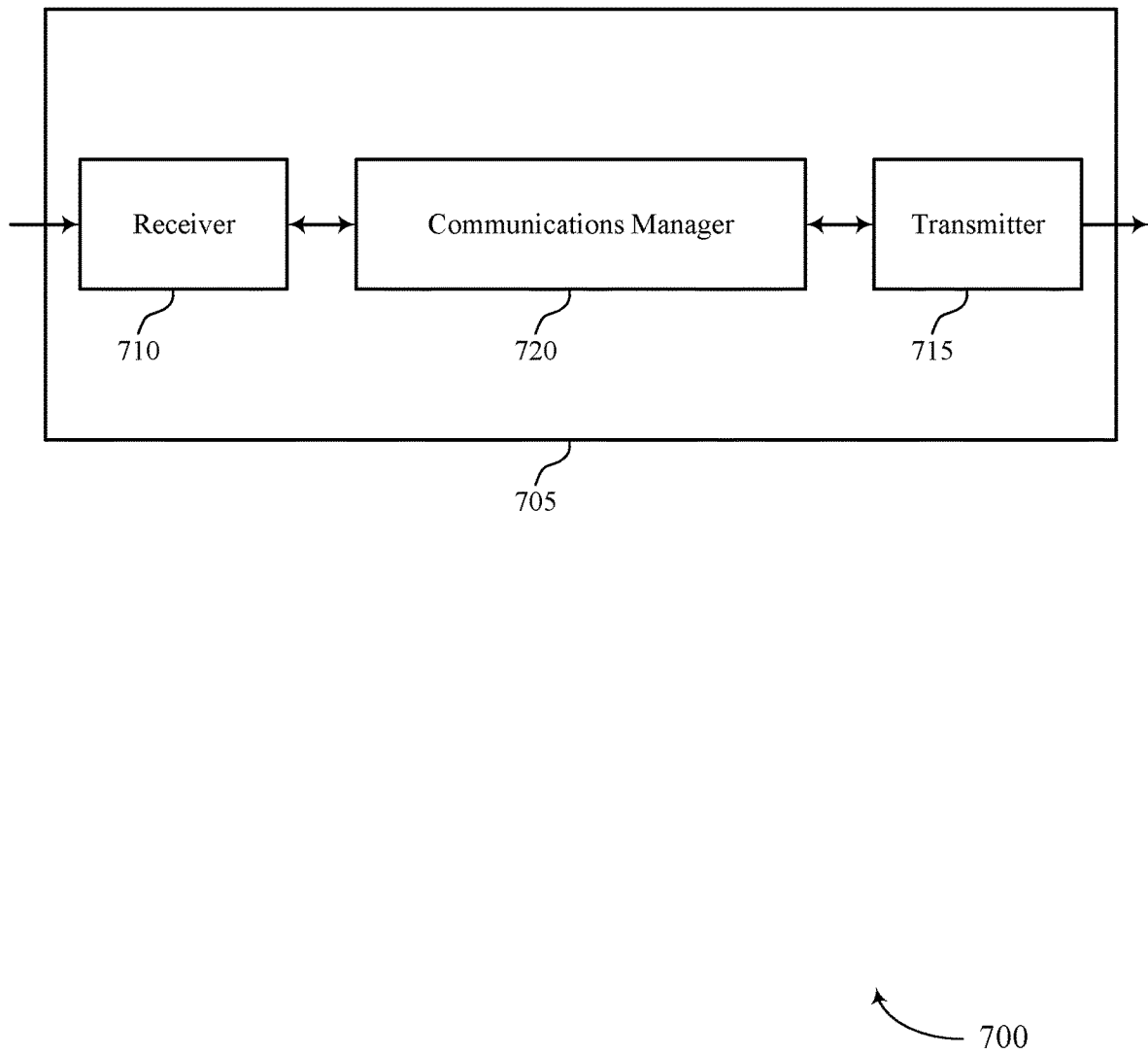
FIGS. 7 and 8 show block diagrams of devices that support opportunistic cooperative relaying of sidelink signals in accordance with aspects of the present disclosure.

FIG. 7 shows a block diagram 700 of a device 705 that supports opportunistic cooperative relaying of sidelink signals in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to opportunistic cooperative relaying of sidelink signals). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to opportunistic cooperative relaying of sidelink signals). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of opportunistic cooperative relaying of sidelink signals as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for transmitting sidelink signaling indicating a request for one or more additional UEs to opportunistically relay the sidelink signaling in a resource configured for single frequency network-type transmission. The communications manager 720 may be configured as or otherwise support a means for receiving feedback signaling including a positive acknowledgment for the sidelink signaling based on the request for the one or more additional UEs to opportunistically relay the sidelink signaling.

Additionally or alternatively, the communications manager 720 may support wireless communications at a second UE in accordance with examples as disclosed herein. For example, the communications manager 720 may be configured as or otherwise support a means for receiving, from a first UE, first sidelink signaling indicating a request for one or more additional UEs to opportunistically relay the first sidelink signaling in a resource configured for single frequency network-type transmission. The communications manager 720 may be configured as or otherwise support a means for generating second sidelink signaling corresponding to (e.g., including the same data as) the first sidelink signaling based on the request. The communications manager 720 may be configured as or otherwise support a means for transmitting the second sidelink signaling in the resource configured for single frequency network-type transmission based on the generating.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for enabling the device 705 to reduce processing overhead by supporting reliable sidelink communications between UEs 115 without performing beamforming alignment procedures. Refraining from performing beamforming alignment may decrease resource consumption (e.g., power resources), increase device efficiency, and decrease latency. Additionally, improving communication reliability using opportunistic cooperative relaying may reduce the quantity of retransmissions performed for failed transmissions, reducing processing overhead and improving device efficiency.

Figure 8:
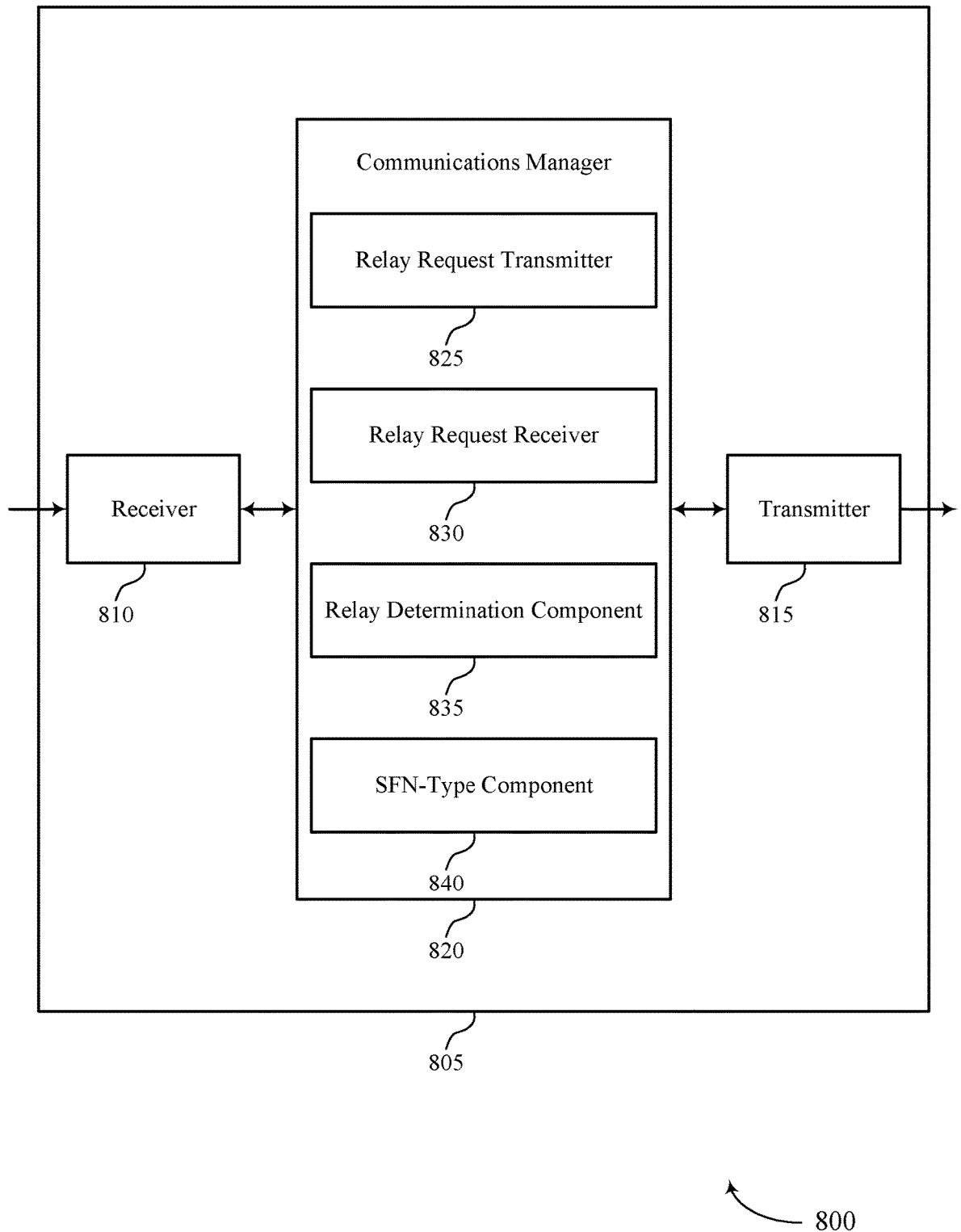

FIG. 8 shows a block diagram 800 of a device 805 that supports opportunistic cooperative relaying of sidelink signals in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to opportunistic cooperative relaying of sidelink signals). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to opportunistic cooperative relaying of sidelink signals). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of opportunistic cooperative relaying of sidelink signals as described herein. For example, the communications manager 820 may include a relay request transmitter 825, a relay request receiver 830, a relay determination component 835, an SFN-type component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The relay request transmitter 825 may be configured as or otherwise support a means for transmitting sidelink signaling indicating a request for one or more additional UEs to opportunistically relay the sidelink signaling in a resource configured for single frequency network-type transmission. The relay request receiver 830 may be configured as or otherwise support a means for receiving feedback signaling including a positive acknowledgment for the sidelink signaling based on the request for the one or more additional UEs to opportunistically relay the sidelink signaling.

Additionally or alternatively, the communications manager 820 may support wireless communications at a second UE in accordance with examples as disclosed herein. The relay request receiver 830 may be configured as or otherwise support a means for receiving, from a first UE, first sidelink signaling indicating a request for one or more additional UEs to opportunistically relay the first sidelink signaling in a resource configured for single frequency network-type transmission. The relay determination component 835 may be configured as or otherwise support a means for generating second sidelink signaling corresponding to the first sidelink signaling based on the request. The SFN-type component 840 may be configured as or otherwise support a means for transmitting the second sidelink signaling in the resource configured for single frequency network-type transmission based on the generating.

Figure 9:
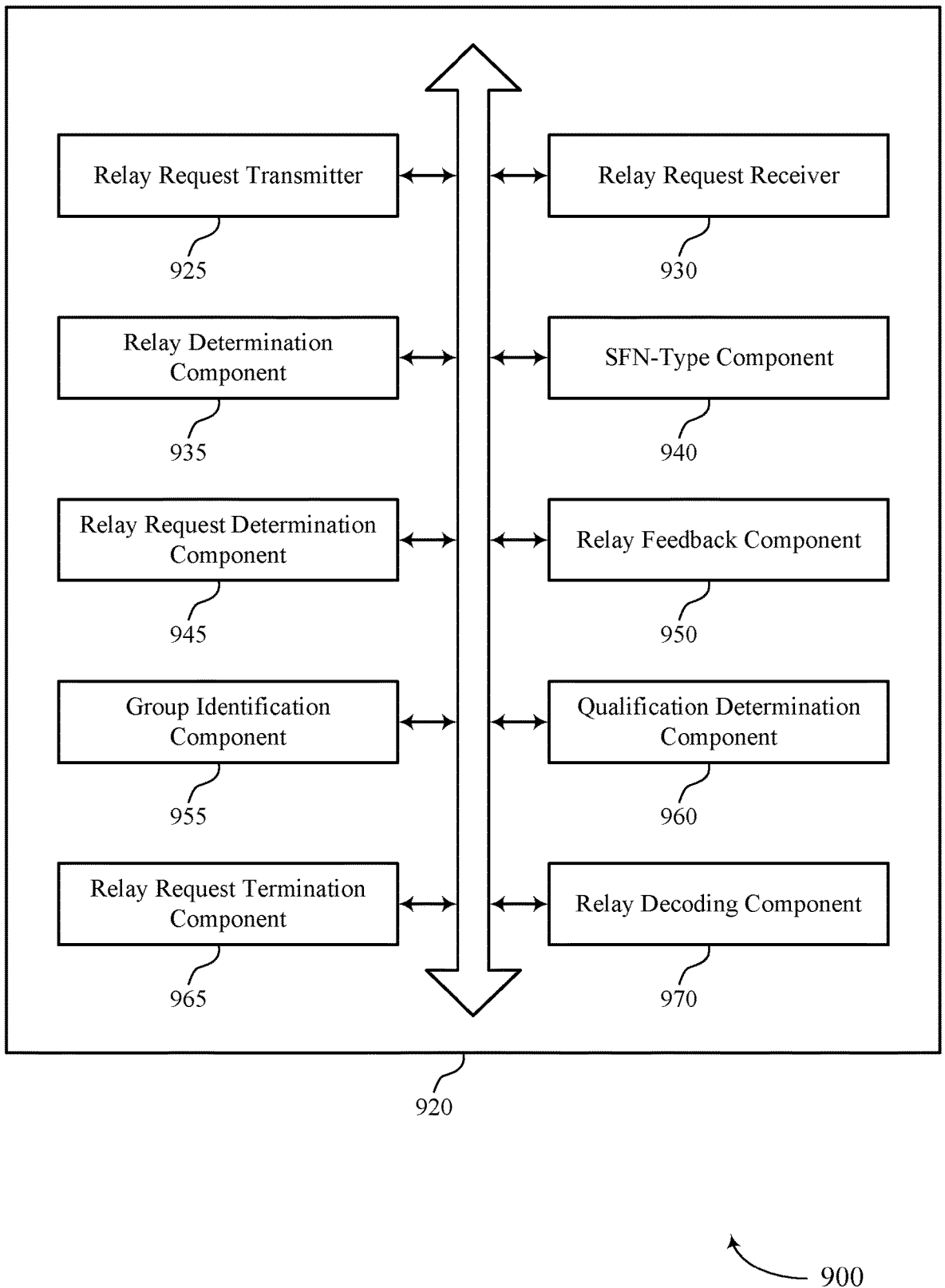
FIG. 9 shows a block diagram of a communications manager that supports opportunistic cooperative relaying of sidelink signals in accordance with aspects of the present disclosure.

FIG. 9 shows a block diagram 900 of a communications manager 920 that supports opportunistic cooperative relaying of sidelink signals in accordance with aspects of the present disclosure. The communications manager 920 may be an example of aspects of a communications manager 720, a communications manager 820, or both, as described herein. The communications manager 920, or various components thereof, may be an example of means for performing various aspects of opportunistic cooperative relaying of sidelink signals as described herein. For example, the communications manager 920 may include a relay request transmitter 925, a relay request receiver 930, a relay determination component 935, an SFN-type component 940, a relay request determination component 945, a relay feedback component 950, a group identification component 955, a qualification determination component 960, a relay request termination component 965, a relay decoding component 970, or any combination thereof. Each of these components may communicate, directly or indirectly, with one another (e.g., via one or more buses).

The communications manager 920 may support wireless communications at a first UE in accordance with examples as disclosed herein. The relay request transmitter 925 may be configured as or otherwise support a means for transmitting sidelink signaling indicating a request for one or more additional UEs to opportunistically relay the sidelink signaling in a resource configured for single frequency network-type transmission. The relay request receiver 930 may be configured as or otherwise support a means for receiving feedback signaling including a positive acknowledgment for the sidelink signaling based on the request for the one or more additional UEs to opportunistically relay the sidelink signaling.

In some examples, the SFN-type component 940 may be configured as or otherwise support a means for retransmitting the sidelink signaling in the resource configured for single frequency network-type transmission based on the request.

In some examples, the retransmitted sidelink signaling indicates a second request for the one or more additional UEs to opportunistically relay the sidelink signaling in a second resource configured for single frequency network-type transmission.

In some examples, the retransmitted sidelink signaling refrains from indicating a second request for the one or more additional UEs to opportunistically relay the sidelink signaling.

In some examples, the relay request determination component 945 may be configured as or otherwise support a means for setting a destination identifier of the sidelink signaling to indicate a group identifier, the one or more additional UEs corresponding to the group identifier.

In some examples, an association between the group identifier and the one or more additional UEs is defined at the first UE, configured by a SIB, configured by an RRC signal, or any combination thereof.

In some examples, the relay request transmitter 925 may be configured as or otherwise support a means for performing a beam sweeping procedure, where the sidelink signaling is transmitted using a set of multiple beams based on the beam sweeping procedure.

In some examples, the sidelink signaling requests feedback from the one or more additional UEs to indicate which UEs of the one or more additional UEs opportunistically relay the sidelink signaling in the resource configured for single frequency network-type transmission. In some examples, the feedback signaling is received from a second UE of the one or more additional UEs, the feedback signaling acknowledging that the second UE received the sidelink signaling and is opportunistically relaying the sidelink signaling in the resource configured for single frequency network-type transmission.

In some examples, the relay feedback component 950 may be configured as or otherwise support a means for monitoring for second feedback signaling from a third UE in a feedback resource corresponding to the resource configured for single frequency network-type transmission based on receiving the feedback signaling acknowledging that the second UE received the sidelink signaling and is opportunistically relaying the sidelink signaling in the resource configured for single frequency network-type transmission, where the sidelink signaling is intended for the third UE.

In some examples, the sidelink signaling is intended for a third UE and requests feedback from the third UE. In some examples, the feedback signaling is received from the third UE in a unicast transmission.

In some examples, the relay request termination component 965 may be configured as or otherwise support a means for terminating a beam sweeping procedure based on receiving the feedback signaling from the third UE prior to completion of the beam sweeping procedure.

In some examples, the sidelink signaling includes a groupcast transmission, a broadcast transmission, or both and is transmitted to a set of multiple UEs.

In some examples, the sidelink signaling is intended for a third UE and requests feedback from a second UE of the one or more additional UEs with an established sidelink connection with the third UE. In some examples, the feedback signaling is received from the second UE of the one or more additional UEs, the feedback signaling acknowledging that the second UE received the sidelink signaling and is opportunistically relaying the sidelink signaling in the resource configured for single frequency network-type transmission using the established sidelink connection with the third UE.

In some examples, the sidelink signaling includes sidelink control information. In some examples, the sidelink control information includes a control element indicating the request for the one or more additional UEs to opportunistically relay the sidelink signaling.

Additionally or alternatively, the communications manager 920 may support wireless communications at a second UE in accordance with examples as disclosed herein. In some examples, the relay request receiver 930 may be configured as or otherwise support a means for receiving, from a first UE, first sidelink signaling indicating a request for one or more additional UEs to opportunistically relay the first sidelink signaling in a resource configured for single frequency network-type transmission. The relay determination component 935 may be configured as or otherwise support a means for generating second sidelink signaling corresponding to the first sidelink signaling based on the request. The SFN-type component 940 may be configured as or otherwise support a means for transmitting the second sidelink signaling in the resource configured for single frequency network-type transmission based on the generating.

In some examples, the group identification component 955 may be configured as or otherwise support a means for determining a group of UEs associated with the request based on a group identifier indicated by the first sidelink signaling. In some examples, the group identification component 955 may be configured as or otherwise support a means for determining to transmit the second sidelink signaling based on the group of UEs including the second UE.

In some examples, the relay decoding component 970 may be configured as or otherwise support a means for decoding a data portion of the first sidelink signaling based on the group of UEs including the second UE, where the second sidelink signaling is generated to include the data portion based on the decoding.

In some examples, the relay determination component 935 may be configured as or otherwise support a means for determining to transmit the second sidelink signaling further based on a source identifier indicated by the first sidelink signaling, a destination identifier indicated by the first sidelink signaling, a zone identifier indicated by the first sidelink signaling, the first UE corresponding to a parent node of the second UE, the destination identifier associated with a third UE corresponding to a child node of the second UE, or any combination thereof.

In some examples, the qualification determination component 960 may be configured as or otherwise support a means for determining to transmit the second sidelink signaling further based on a qualification rule for operating as an opportunistic relay for the first UE, where the qualification rule is defined at the second UE, configured by a system information block, configured by a RRC signal, configured by sidelink control information, or any combination thereof.

In some examples, the relay determination component 935 may be configured as or otherwise support a means for determining to opportunistically relay the first sidelink signaling based on receiving the first sidelink signaling and based on the request, where opportunistically relaying the first sidelink signaling includes the transmitting the second sidelink signaling without an established agreement for the second UE to relay signaling for the first UE.

In some examples, to support generating the second sidelink signaling, the relay determination component 935 may be configured as or otherwise support a means for setting a source identifier of the second sidelink signaling to an identifier of the first UE.

In some examples, the relay request determination component 945 may be configured as or otherwise support a means for determining a proxy identifier indicated by the first sidelink signaling, where, to support generating the second sidelink signaling, the relay determination component 935 may be configured as or otherwise support a means for setting a source identifier of the second sidelink signaling to the proxy identifier.

In some examples, to support generating the second sidelink signaling, the relay determination component 935 may be configured as or otherwise support a means for setting a bit indicating that the second sidelink signaling is a single frequency network-type transmission.

In some examples, the first sidelink signaling includes a reservation field indicating one or more resources from a resource pool supporting opportunistic relaying of sidelink signals, the one or more resources including at least the resource configured for single frequency network-type transmission.

In some examples, the relay determination component 935 may be configured as or otherwise support a means for receiving control signaling configuring the resource pool supporting the opportunistic relaying of sidelink signals.

In some examples, the first sidelink signaling includes stage-two sidelink control information, a medium access control element, or both including the reservation field.

In some examples, the one or more resources include a second resource configured for single frequency network-type transmission and the second sidelink signaling is transmitted using a first communication beam in the resource configured for single frequency network-type transmission, and the SFN-type component 940 may be configured as or otherwise support a means for retransmitting the second sidelink signaling using a second communication beam different from the first communication beam in the second resource configured for single frequency network-type transmission.

In some examples, the SFN-type component 940 may be configured as or otherwise support a means for receiving, from a third UE, third sidelink signaling indicating a second request for a second one or more additional UEs to opportunistically relay the third sidelink signaling in a second resource configured for single frequency network-type transmission. In some examples, the relay determination component 935 may be configured as or otherwise support a means for detecting fourth sidelink signaling preempting the second resource configured for single frequency network-type transmission. In some examples, the relay determination component 935 may be configured as or otherwise support a means for refraining from transmitting fifth sidelink signaling corresponding to the third sidelink signaling in the second resource configured for single frequency network-type transmission based on the detecting.

In some examples, the first sidelink signaling includes sidelink control information. In some examples, the sidelink control information includes a control element indicating the request for the one or more additional UEs to opportunistically relay the first sidelink signaling.

Figure 10:
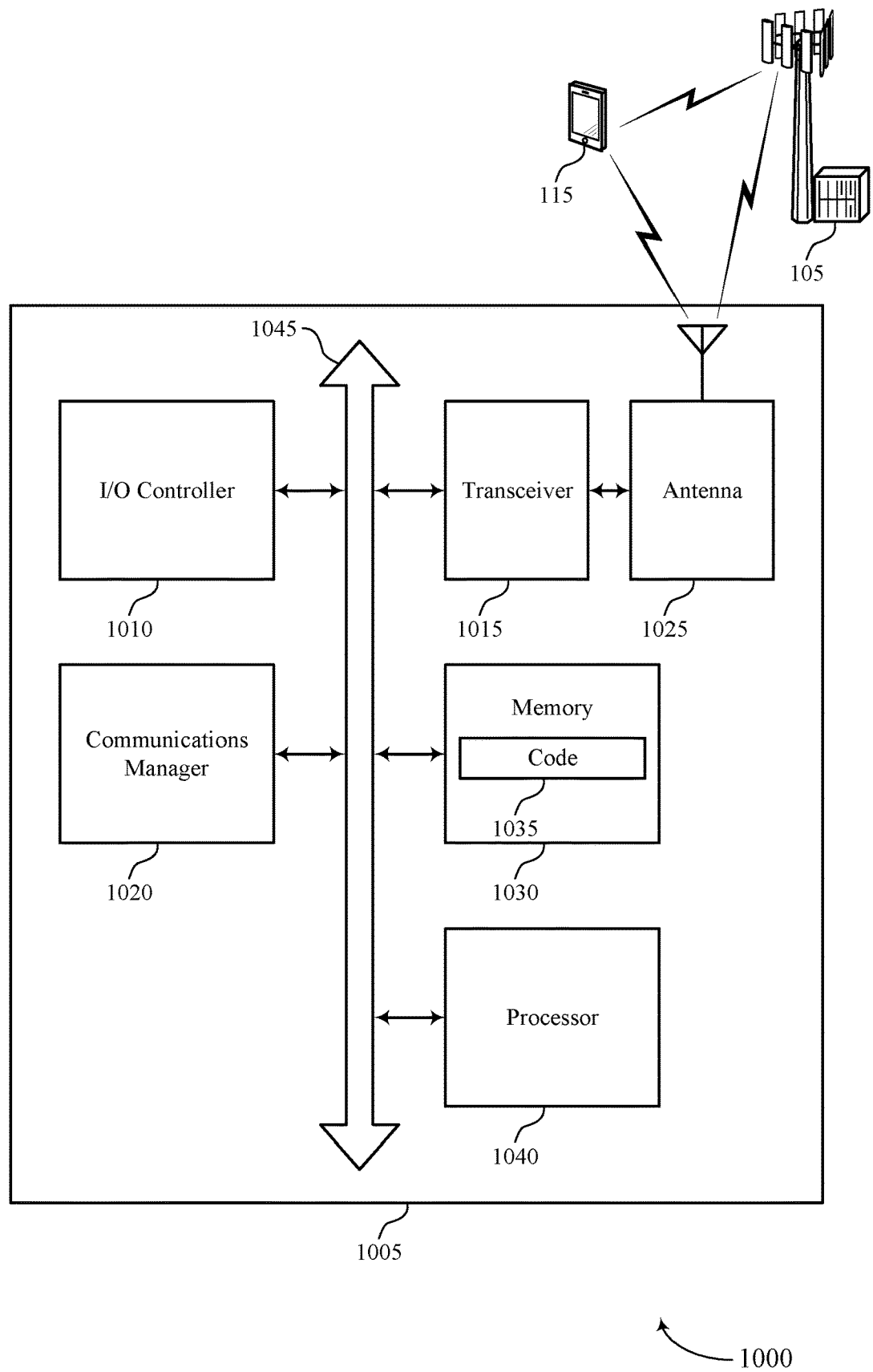
FIG. 10 shows a diagram of a system including a device that supports opportunistic cooperative relaying of sidelink signals in accordance with aspects of the present disclosure.

FIG. 10 shows a diagram of a system 1000 including a device 1005 that supports opportunistic cooperative relaying of sidelink signals in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting opportunistic cooperative relaying of sidelink signals). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for transmitting sidelink signaling indicating a request for one or more additional UEs to opportunistically relay the sidelink signaling in a resource configured for single frequency network-type transmission. The communications manager 1020 may be configured as or otherwise support a means for receiving feedback signaling including a positive acknowledgment for the sidelink signaling based on the request for the one or more additional UEs to opportunistically relay the sidelink signaling.

Additionally or alternatively, the communications manager 1020 may support wireless communications at a second UE in accordance with examples as disclosed herein. For example, the communications manager 1020 may be configured as or otherwise support a means for receiving, from a first UE, first sidelink signaling indicating a request for one or more additional UEs to opportunistically relay the first sidelink signaling in a resource configured for single frequency network-type transmission. The communications manager 1020 may be configured as or otherwise support a means for generating second sidelink signaling corresponding to the first sidelink signaling based on the request. The communications manager 1020 may be configured as or otherwise support a means for transmitting the second sidelink signaling in the resource configured for single frequency network-type transmission based on the generating.

By including or configuring the communications manager 1020 in accordance with examples as described herein, the device 1005 may support techniques for enabling a wireless device to communicate sidelink signaling with a second wireless device without performing beamforming alignment procedures, which may decrease signaling overhead, decrease latency, and increase overall device efficiency. Additionally, by using opportunistic cooperative relaying, the device 1005 may support techniques for improved sidelink communication reliability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of opportunistic cooperative relaying of sidelink signals as described herein, or the processor 1040 and the memory 1030 may be otherwise configured to perform or support such operations.

Figure 11:
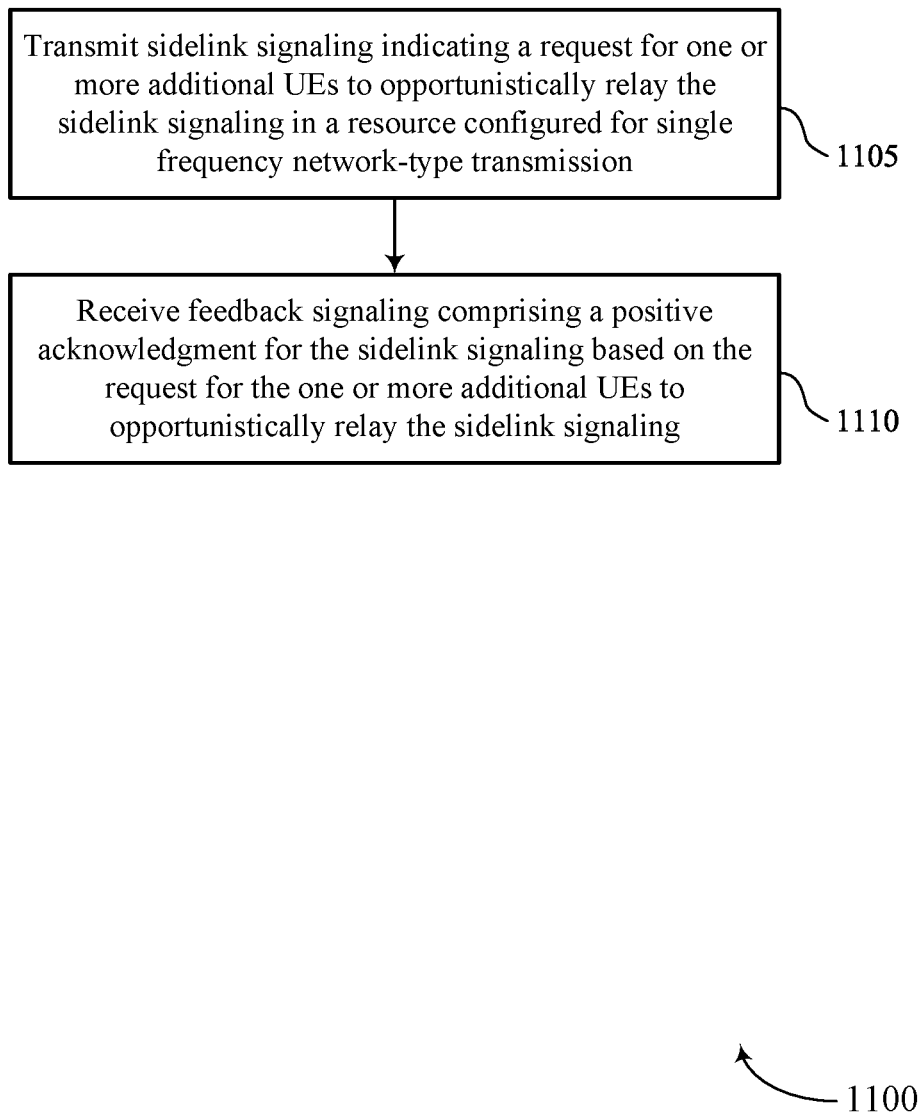
FIGS. 11 through 14 show flowcharts illustrating methods that support opportunistic cooperative relaying of sidelink signals in accordance with aspects of the present disclosure.

FIG. 11 shows a flowchart illustrating a method 1100 that supports opportunistic cooperative relaying of sidelink signals in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include transmitting sidelink signaling indicating a request for one or more additional UEs to opportunistically relay the sidelink signaling in a resource configured for single frequency network-type transmission. The operations of 1105 may be performed in accordance with examples as disclosed herein. In some examples, aspects of the operations of 1105 may be performed by a relay request transmitter 925 as described with reference to FIG. 9.

At 1110, the method may include receiving feedback signaling including a positive acknowledgment for the sidelink signaling based on the request for the one or more additional UEs to opportunistically relay the sidelink signaling. The operations of 1110 may be performed in accordance with examples as disclosed herein. In some examples, aspects of the operations of 1110 may be performed by a relay request receiver 930 as described with reference to FIG. 9.

Figure 12:
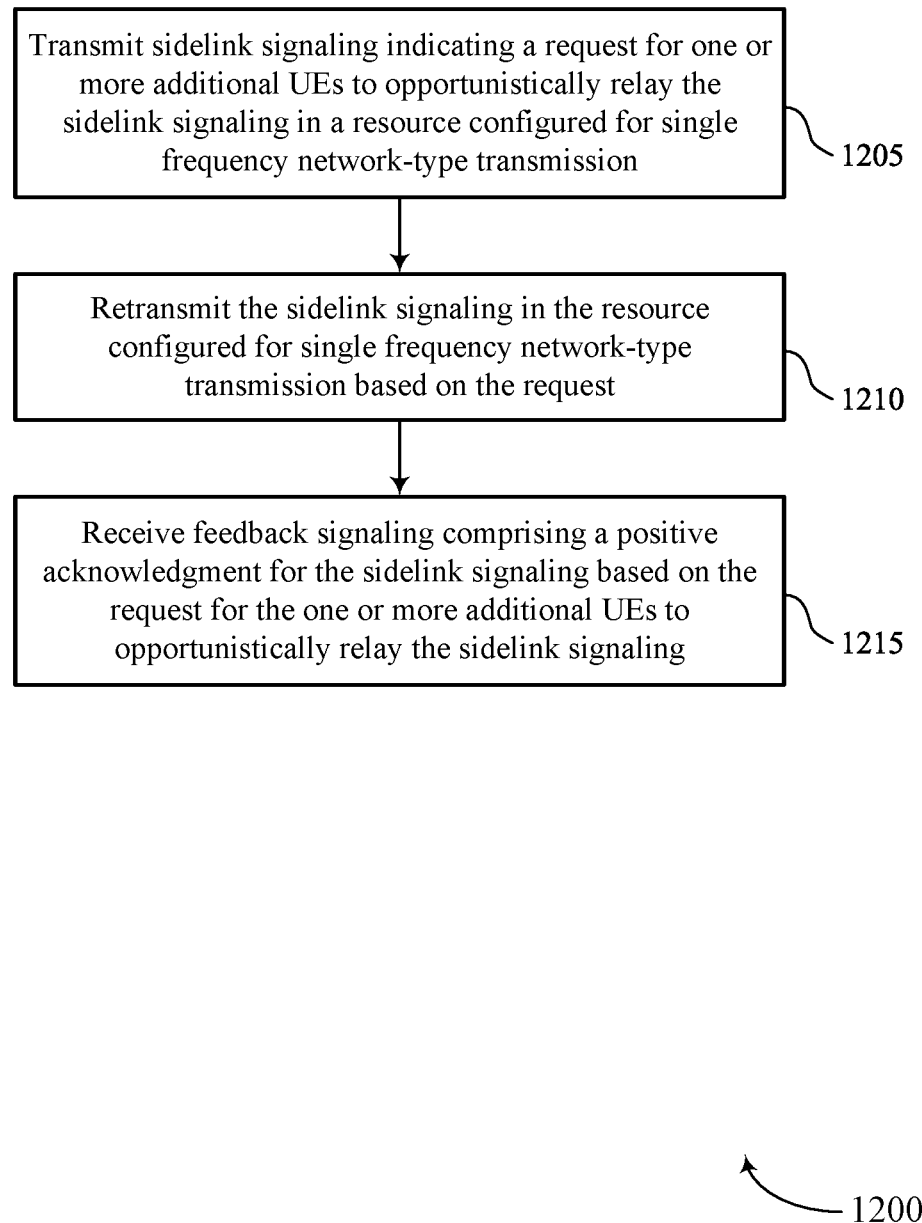

FIG. 12 shows a flowchart illustrating a method 1200 that supports opportunistic cooperative relaying of sidelink signals in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include transmitting sidelink signaling indicating a request for one or more additional UEs to opportunistically relay the sidelink signaling in a resource configured for single frequency network-type transmission. The operations of 1205 may be performed in accordance with examples as disclosed herein. In some examples, aspects of the operations of 1205 may be performed by a relay request transmitter 925 as described with reference to FIG. 9.

At 1210, the method may include retransmitting the sidelink signaling in the resource configured for single frequency network-type transmission based on the request. The operations of 1210 may be performed in accordance with examples as disclosed herein. In some examples, aspects of the operations of 1210 may be performed by a SFN-type component 940 as described with reference to FIG. 9.

At 1215, the method may include receiving feedback signaling including a positive acknowledgment for the sidelink signaling based on the request for the one or more additional UEs to opportunistically relay the sidelink signaling. The operations of 1215 may be performed in accordance with examples as disclosed herein. In some examples, aspects of the operations of 1215 may be performed by a relay request receiver 930 as described with reference to FIG. 9.

Figure 13:
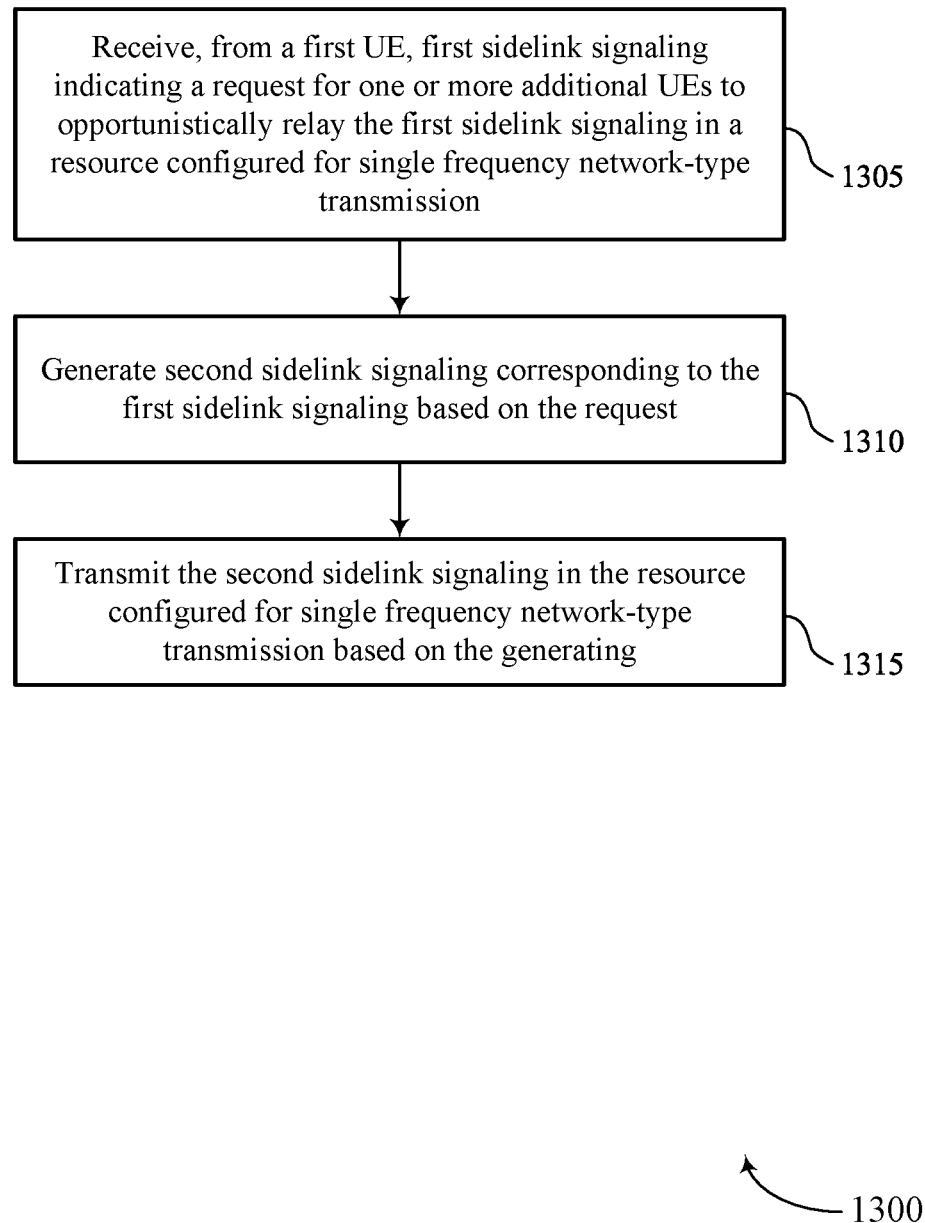

FIG. 13 shows a flowchart illustrating a method 1300 that supports opportunistic cooperative relaying of sidelink signals in accordance with aspects of the present disclosure.

The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving, from a first UE, first sidelink signaling indicating a request for one or more additional UEs to opportunistically relay the first sidelink signaling in a resource configured for single frequency network-type transmission. The operations of 1305 may be performed in accordance with examples as disclosed herein. In some examples, aspects of the operations of 1305 may be performed by a relay request receiver 930 as described with reference to FIG. 9.

At 1310, the method may include generating second sidelink signaling corresponding to the first sidelink signaling based on the request. The operations of 1310 may be performed in accordance with examples as disclosed herein. In some examples, aspects of the operations of 1310 may be performed by a relay determination component 935 as described with reference to FIG. 9.

At 1315, the method may include transmitting the second sidelink signaling in the resource configured for single frequency network-type transmission based on the generating. The operations of 1315 may be performed in accordance with examples as disclosed herein. In some examples, aspects of the operations of 1315 may be performed by a SFN-type component 940 as described with reference to FIG. 9.

Figure 14:
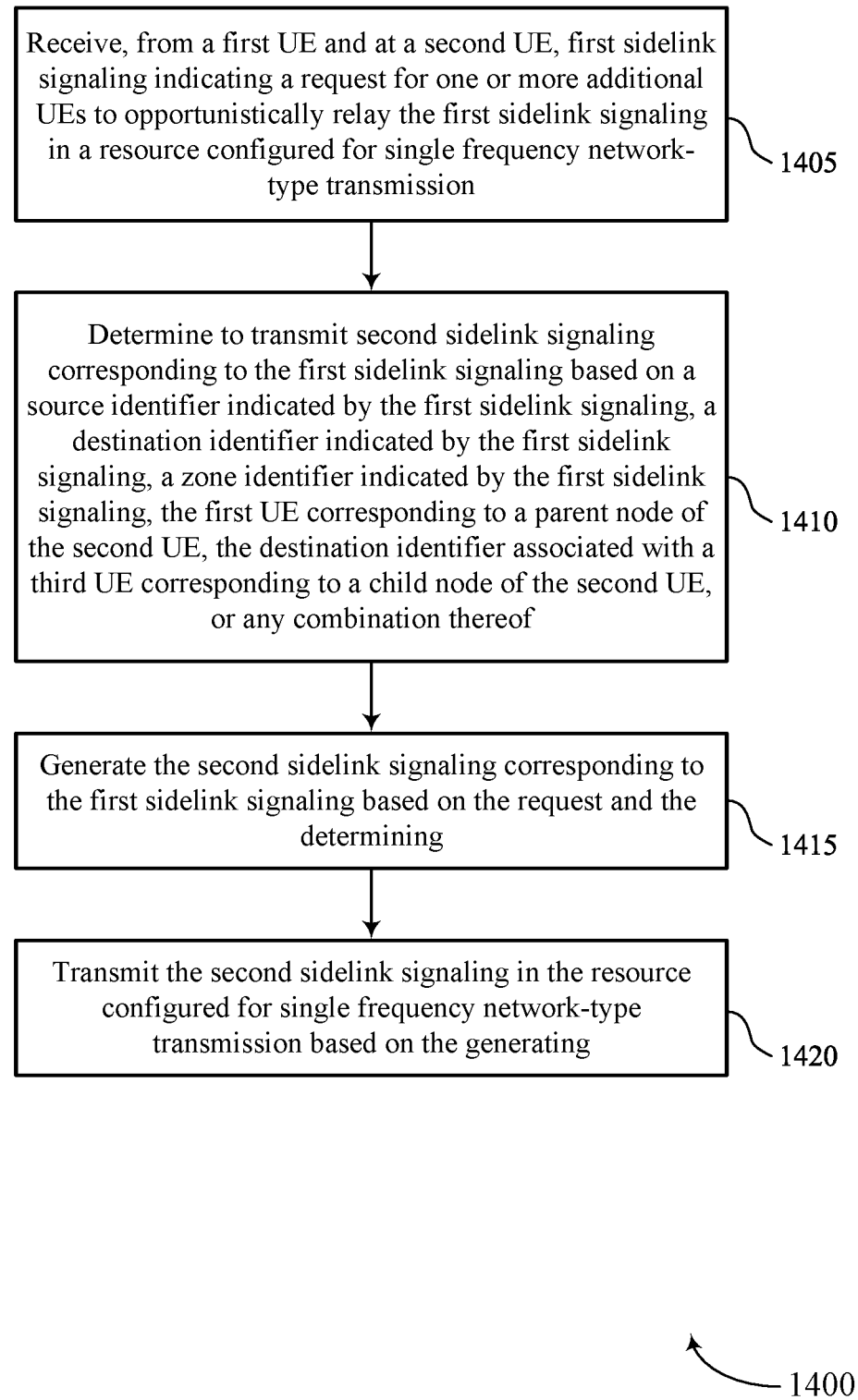

FIG. 14 shows a flowchart illustrating a method 1400 that supports opportunistic cooperative relaying of sidelink signals in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include receiving, from a first UE, first sidelink signaling indicating a request for one or more additional UEs to opportunistically relay the first sidelink signaling in a resource configured for single frequency network-type transmission. The operations of 1405 may be performed in accordance with examples as disclosed herein. In some examples, aspects of the operations of 1405 may be performed by a relay request receiver 930 as described with reference to FIG. 9.

At 1410, the method may include determining to transmit second sidelink signaling corresponding to the first sidelink signaling based on a source identifier indicated by the first sidelink signaling, a destination identifier indicated by the first sidelink signaling, a zone identifier indicated by the first sidelink signaling, the first UE corresponding to a parent node of the second UE, the destination identifier associated with a third UE corresponding to a child node of the second UE, or any combination thereof. The operations of 1410 may be performed in accordance with examples as disclosed herein. In some examples, aspects of the operations of 1410 may be performed by a relay determination component 935 as described with reference to FIG. 9.

At 1415, the method may include generating the second sidelink signaling corresponding to the first sidelink signaling based on the request and the determining. The operations of 1415 may be performed in accordance with examples as disclosed herein. In some examples, aspects of the operations of 1415 may be performed by a relay determination component 935 as described with reference to FIG. 9.

At 1420, the method may include transmitting the second sidelink signaling in the resource configured for single frequency network-type transmission based on the generating. The operations of 1420 may be performed in accordance with examples as disclosed herein. In some examples, aspects of the operations of 1420 may be performed by a SFN-type component 940 as described with reference to FIG. 9.

The following provides an overview of aspects of the present disclosure:

Aspect 1: A method for wireless communications at a first UE, comprising: transmitting sidelink signaling indicating a request for one or more additional UEs to opportunistically relay the sidelink signaling in a resource configured for single frequency network-type transmission; and receiving feedback signaling comprising a positive acknowledgment for the sidelink signaling based at least in part on the request for the one or more additional UEs to opportunistically relay the sidelink signaling.

Aspect 2: The method of aspect 1, further comprising: retransmitting the sidelink signaling in the resource configured for single frequency network-type transmission based at least in part on the request.

Aspect 3: The method of aspect 2, wherein the retransmitted sidelink signaling indicates a second request for the one or more additional UEs to opportunistically relay the sidelink signaling in a second resource configured for single frequency network-type transmission.

Aspect 4: The method of aspect 2, wherein the retransmitted sidelink signaling refrains from indicating a second request for the one or more additional UEs to opportunistically relay the sidelink signaling.

Aspect 5: The method of any of aspects 1 through 4, further comprising: setting a destination identifier of the sidelink signaling to indicate a group identifier, the one or more additional UEs corresponding to the group identifier.

Aspect 6: The method of aspect 5, wherein an association between the group identifier and the one or more additional UEs is defined at the first UE, configured by a system information block, configured by a radio resource control signal, or any combination thereof.

Aspect 7: The method of any of aspects 1 through 6, further comprising: performing a beam sweeping procedure, wherein the sidelink signaling is transmitted using a plurality of beams based at least in part on the beam sweeping procedure.

Aspect 8: The method of any of aspects 1 through 7, wherein the sidelink signaling requests feedback from the one or more additional UEs to indicate which UEs of the one or more additional UEs opportunistically relay the sidelink signaling in the resource configured for single frequency network-type transmission; and the feedback signaling is received from a second UE of the one or more additional UEs, the feedback signaling acknowledging that the second UE received the sidelink signaling and is opportunistically relaying the sidelink signaling in the resource configured for single frequency network-type transmission.

Aspect 9: The method of aspect 8, further comprising: monitoring for second feedback signaling from a third UE in a feedback resource corresponding to the resource configured for single frequency network-type transmission based at least in part on receiving the feedback signaling acknowledging that the second UE received the sidelink signaling and is opportunistically relaying the sidelink signaling in the resource configured for single frequency network-type transmission, wherein the sidelink signaling is intended for the third UE.

Aspect 10: The method of any of aspects 1 through 9, wherein the sidelink signaling is intended for a third UE and requests feedback from the third UE; and the feedback signaling is received from the third UE in a unicast transmission.

Aspect 11: The method of aspect 10, further comprising: terminating a beam sweeping procedure based at least in part on receiving the feedback signaling from the third UE prior to completion of the beam sweeping procedure.

Aspect 12: The method of any of aspects 1 through 11, wherein the sidelink signaling comprises a groupcast transmission, a broadcast transmission, or both and is transmitted to a plurality of UEs.

Aspect 13: The method of any of aspects 1 through 12, wherein the sidelink signaling is intended for a third UE and requests feedback from a second UE of the one or more additional UEs with an established sidelink connection with the third UE; and the feedback signaling is received from the second UE of the one or more additional UEs, the feedback signaling acknowledging that the second UE received the sidelink signaling and is opportunistically relaying the sidelink signaling in the resource configured for single frequency network-type transmission using the established sidelink connection with the third UE.

Aspect 14: The method of any of aspects 1 through 13, wherein the sidelink signaling comprises sidelink control information; and the sidelink control information comprises a control element indicating the request for the one or more additional UEs to opportunistically relay the sidelink signaling.

Aspect 15: A method for wireless communications at a second UE, comprising: receiving, from a first UE, first sidelink signaling indicating a request for one or more additional UEs to opportunistically relay the first sidelink signaling in a resource configured for single frequency network-type transmission; generating second sidelink signaling corresponding to the first sidelink signaling based at least in part on the request; and transmitting the second sidelink signaling in the resource configured for single frequency network-type transmission based at least in part on the generating.

Aspect 16: The method of aspect 15, further comprising: determining a group of UEs associated with the request based at least in part on a group identifier indicated by the first sidelink signaling; and determining to transmit the second sidelink signaling based at least in part on the group of UEs comprising the second UE.

Aspect 17: The method of aspect 16, further comprising: decoding a data portion of the first sidelink signaling based at least in part on the group of UEs comprising the second UE, wherein the second sidelink signaling is generated to comprise the data portion based at least in part on the decoding.

Aspect 18: The method of any of aspects 15 through 17, further comprising: determining to transmit the second sidelink signaling further based at least in part on a source identifier indicated by the first sidelink signaling, a destination identifier indicated by the first sidelink signaling, a zone identifier indicated by the first sidelink signaling, the first UE corresponding to a parent node of the second UE, the destination identifier associated with a third UE corresponding to a child node of the second UE, or any combination thereof.

Aspect 19: The method of any of aspects 15 through 18, further comprising: determining to transmit the second sidelink signaling further based at least in part on a qualification rule for operating as an opportunistic relay for the first UE, wherein the qualification rule is defined at the second UE, configured by a system information block, configured by a radio resource control signal, configured by sidelink control information, or any combination thereof.

Aspect 20: The method of any of aspects 15 through 19, further comprising: determining to opportunistically relay the first sidelink signaling based at least in part on receiving the first sidelink signaling and based at least in part on the request, wherein opportunistically relaying the first sidelink signaling comprises the transmitting the second sidelink signaling without an established agreement for the second UE to relay signaling for the first UE.

Aspect 21: The method of any of aspects 15 through 20, wherein generating the second sidelink signaling comprises: setting a source identifier of the second sidelink signaling to an identifier of the first UE.

Aspect 22: The method of any of aspects 15 through 20, further comprising: determining a proxy identifier indicated by the first sidelink signaling, wherein generating the second sidelink signaling comprises: setting a source identifier of the second sidelink signaling to the proxy identifier.

Aspect 23: The method of any of aspects 15 through 22, wherein generating the second sidelink signaling comprises: setting a bit indicating that the second sidelink signaling is a single frequency network-type transmission.

Aspect 24: The method of any of aspects 15 through 23, wherein the first sidelink signaling comprises a reservation field indicating one or more resources from a resource pool supporting opportunistic relaying of sidelink signals, the one or more resources comprising at least the resource configured for single frequency network-type transmission.

Aspect 25: The method of aspect 24, further comprising: receiving control signaling configuring the resource pool supporting the opportunistic relaying of sidelink signals.

Aspect 26: The method of any of aspects 24 through 25, wherein the first sidelink signaling comprises stage-two sidelink control information, a medium access control element, or both comprising the reservation field.

Aspect 27: The method of any of aspects 24 through 26, wherein the one or more resources comprise a second resource configured for single frequency network-type transmission and the second sidelink signaling is transmitted using a first communication beam in the resource configured for single frequency network-type transmission, the method further comprising: retransmitting the second sidelink signaling using a second communication beam different from the first communication beam in the second resource configured for single frequency network-type transmission.

Aspect 28: The method of any of aspects 15 through 27, further comprising: receiving, from a third UE, third sidelink signaling indicating a second request for a second one or more additional UEs to opportunistically relay the third sidelink signaling in a second resource configured for single frequency network-type transmission; detecting fourth sidelink signaling preempting the second resource configured for single frequency network-type transmission; and refraining from transmitting fifth sidelink signaling corresponding to the third sidelink signaling in the second resource configured for single frequency network-type transmission based at least in part on the detecting.

Aspect 29: The method of any of aspects 15 through 28, wherein the first sidelink signaling comprises sidelink control information; and the sidelink control information comprises a control element indicating the request for the one or more additional UEs to opportunistically relay the first sidelink signaling.

Aspect 30: An apparatus for wireless communications at a first UE, comprising a processor; memory coupled with the processor; and instructions stored in the memory and executable by the processor to cause the apparatus to perform a method of any of aspects 1 through 14.

Aspect 31: An apparatus for wireless communications at a first UE, comprising at least one means for performing a method of any of aspects 1 through 14.

Aspect 32: A non-transitory computer-readable medium storing code for wireless communications at a first UE, the code comprising instructions executable by a processor to perform a method of any of aspects 1 through 14.

Aspect 33: An apparatus for wireless communications at a second UE, comprising a processor; memory coupled with the processor; and instructions stored in the memory and executable by the processor to cause the apparatus to perform a method of any of aspects 15 through 29.

Aspect 34: An apparatus for wireless communications at a second UE, comprising at least one means for performing a method of any of aspects 15 through 29.

Aspect 35: A non-transitory computer-readable medium storing code for wireless communications at a second UE, the code comprising instructions executable by a processor to perform a method of any of aspects 15 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
    at least one processor;
    at least one memory coupled with the at least one processor; and
    instructions stored in the at least one memory and executable by the at least one processor to cause the apparatus to:
        transmit sidelink signaling, wherein the sidelink signaling indicates a request for one or more additional UEs to opportunistically relay the sidelink signaling in a resource configured for single frequency network-type transmission, and wherein the sidelink signaling requests feedback from the one or more additional UEs to indicate which UEs of the one or more additional UEs opportunistically relay the sidelink signaling in the resource configured for single frequency network-type transmission; and
        receive feedback signaling comprising a positive acknowledgment for the sidelink signaling based at least in part on the request for the one or more additional UEs to opportunistically relay the sidelink signaling, wherein the feedback signaling is received from a second UE of the one or more additional UEs, the feedback signaling acknowledging that the second UE received the sidelink signaling and is opportunistically relaying the sidelink signaling in the resource configured for single frequency network-type transmission.

2. The apparatus of claim 1, wherein the instructions are further executable by the at least one processor to cause the apparatus to:
retransmit the sidelink signaling in the resource configured for single frequency network-type transmission based at least in part on the request.

3. The apparatus of claim 2, wherein the retransmitted sidelink signaling indicates a second request for the one or more additional UEs to opportunistically relay the sidelink signaling in a second resource configured for single frequency network-type transmission.

4. The apparatus of claim 2, wherein the retransmitted sidelink signaling refrains from indicating a second request for the one or more additional UEs to opportunistically relay the sidelink signaling.

5. The apparatus of claim 1, wherein the instructions are further executable by the at least one processor to cause the apparatus to:
set a destination identifier of the sidelink signaling to indicate a group identifier, the one or more additional UEs corresponding to the group identifier.

6. The apparatus of claim 5, wherein an association between the group identifier and the one or more additional UEs is defined at the apparatus, configured by a system information block, configured by a radio resource control signal, or any combination thereof.

7. The apparatus of claim 1, wherein the instructions are further executable by the at least one processor to cause the apparatus to:
perform a beam sweeping procedure, wherein the sidelink signaling is transmitted using a plurality of beams based at least in part on the beam sweeping procedure.

8. The apparatus of claim 1, wherein the instructions are further executable by the at least one processor to cause the apparatus to:
monitor for second feedback signaling from a destination UE in a feedback resource corresponding to the resource configured for single frequency network-type transmission based at least in part on receiving the feedback signaling acknowledging that the second UE received the sidelink signaling and is opportunistically relaying the sidelink signaling in the resource configured for single frequency network-type transmission, wherein the sidelink signaling is intended for the destination UE.

9. The apparatus of claim 1, wherein the sidelink signaling comprises a groupcast transmission, a broadcast transmission, or both and is transmitted to a plurality of UEs.

10. The apparatus of claim 1, wherein:
the sidelink signaling is intended for a destination UE and requests feedback from the second UE of the one or more additional UEs with an established sidelink connection with the destination UE; and
the feedback signaling is received from the second UE of the one or more additional UEs, the feedback signaling acknowledging that the second UE received the sidelink signaling and is opportunistically relaying the sidelink signaling in the resource configured for single frequency network-type transmission using the established sidelink connection with the destination UE.

11. The apparatus of claim 1, wherein:
the sidelink signaling comprises sidelink control information; and
the sidelink control information comprises a control element indicating the request for the one or more additional UEs to opportunistically relay the sidelink signaling.

12. An apparatus for wireless communications at a second user equipment (UE), comprising:
at least one processor;
at least one memory coupled with the at least one processor; and
instructions stored in the at least one memory and executable by the at least one processor to cause the apparatus to:
receive, from a first UE, first sidelink signaling, wherein the first sidelink signaling indicates a request for one or more additional UEs to opportunistically relay the first sidelink signaling in a resource configured for single frequency network-type transmission, and wherein the first sidelink signaling includes a group identifier that indicates a group of UEs associated with the request;
generate second sidelink signaling corresponding to the first sidelink signaling based at least in part on the request; and
transmit the second sidelink signaling in the resource configured for single frequency network-type transmission based at least in part on the group of UEs comprising the second UE.

13. The apparatus of claim 12, wherein the instructions are further executable by the at least one processor to cause the apparatus to:
decode a data portion of the first sidelink signaling based at least in part on the group of UEs comprising the second UE, wherein the second sidelink signaling is generated to comprise the data portion based at least in part on the decoding.

14. The apparatus of claim 12, wherein the instructions are further executable by the at least one processor to cause the apparatus to:
determine to transmit the second sidelink signaling further based at least in part on a source identifier indicated by the first sidelink signaling, a destination identifier indicated by the first sidelink signaling, a zone identifier indicated by the first sidelink signaling, the first UE corresponding to a parent node of the second UE, the destination identifier associated with a destination UE corresponding to a child node of the second UE, or any combination thereof.

15. The apparatus of claim 12, wherein the instructions are further executable by the at least one processor to cause the apparatus to:
determine to transmit the second sidelink signaling further based at least in part on a qualification rule for operating as an opportunistic relay for the first UE, wherein the qualification rule is defined at the second UE, configured by a system information block, configured by a radio resource control signal, configured by sidelink control information, or any combination thereof.

16. The apparatus of claim 12, wherein the instructions are further executable by the at least one processor to cause the apparatus to:
determine to opportunistically relay the first sidelink signaling based at least in part on receiving the first sidelink signaling and based at least in part on the request, wherein the instructions executable by the at least one processor to cause the apparatus to opportunistically relay the first sidelink signaling are executable by the at least one processor to cause the apparatus to transmit the second sidelink signaling without an established agreement for the second UE to relay signaling for the first UE.

17. The apparatus of claim 12, wherein the instructions executable by the at least one processor to cause the apparatus to generate the second sidelink signaling are executable by the at least one processor to cause the apparatus to:
set a source identifier of the second sidelink signaling to an identifier of the first UE.

18. The apparatus of claim 12, wherein the instructions are further executable by the at least one processor to cause the apparatus to:
determine a proxy identifier indicated by the first sidelink signaling, wherein the instructions executable by the at least one processor to cause the apparatus to generate the second sidelink signaling are executable by the at least one processor to cause the apparatus to:
set a source identifier of the second sidelink signaling to the proxy identifier.

19. The apparatus of claim 12, wherein the instructions executable by the at least one processor to cause the apparatus to generate the second sidelink signaling are executable by the at least one processor to cause the apparatus to:
set a bit indicating that the second sidelink signaling is a single frequency network-type transmission.

20. The apparatus of claim 12, wherein the first sidelink signaling comprises a reservation field indicating one or more resources from a resource pool supporting opportunistic relaying of sidelink signals, the one or more resources comprising at least the resource configured for single frequency network-type transmission.

21. The apparatus of claim 20, wherein the instructions are further executable by the at least one processor to cause the apparatus to:
receive control signaling configuring the resource pool supporting the opportunistic relaying of sidelink signals.

22. The apparatus of claim 20, wherein the first sidelink signaling comprises stage-two sidelink control information, a medium access control element, or both comprising the reservation field.

23. The apparatus of claim 20, wherein the one or more resources comprise a second resource configured for single frequency network-type transmission and the second sidelink signaling is transmitted using a first communication beam in the resource configured for single frequency network-type transmission, the instructions further executable by the at least one processor to cause the apparatus to:
retransmit the second sidelink signaling using a second communication beam different from the first communication beam in the second resource configured for single frequency network-type transmission.

24. The apparatus of claim 12, wherein the instructions are further executable by the at least one processor to cause the apparatus to:
receive, from a destination UE, third sidelink signaling indicating a second request for a second one or more additional UEs to opportunistically relay the third sidelink signaling in a second resource configured for single frequency network-type transmission;
detect fourth sidelink signaling preempting the second resource configured for single frequency network-type transmission; and
refrain from transmitting fifth sidelink signaling corresponding to the third sidelink signaling in the second resource configured for single frequency network-type transmission based at least in part on the detecting.

25. A method for wireless communications at a first user equipment (UE), comprising:
transmitting sidelink signaling, wherein the sidelink signaling indicates a request for one or more additional UEs to opportunistically relay the sidelink signaling in a resource configured for single frequency network-type transmission, wherein the sidelink signaling is intended for a destination UE and requests feedback from the destination UE;
receiving feedback signaling comprising a positive acknowledgment for the sidelink signaling based at least in part on the request for the one or more additional UEs to opportunistically relay the sidelink signaling, wherein the feedback signaling is received from the destination UE in a unicast transmission; and
terminating a beam sweeping procedure based at least in part on receiving the feedback signaling from the destination UE prior to completion of the beam sweeping procedure.

26. A method for wireless communications at a second user equipment (UE), comprising:
receiving, from a first UE, first sidelink signaling, wherein the first sidelink signaling indicates a request for one or more additional UEs to opportunistically relay the first sidelink signaling in a resource configured for single frequency network-type transmission, and wherein the first sidelink signaling comprises a reservation field indicating one or more resources from a resource pool supporting opportunistic relaying of sidelink signals, the one or more resources comprising at least the resource configured for single frequency network-type transmission;
generating second sidelink signaling corresponding to the first sidelink signaling based at least in part on the request; and
transmitting the second sidelink signaling in the resource configured for single frequency network-type transmission based at least in part on the generating.

27. The method of claim 26, further comprising:
receiving control signaling configuring the resource pool supporting the opportunistic relaying of sidelink signals.

28. The method of claim 26, wherein the first sidelink signaling comprises stage-two sidelink control information, a medium access control element, or both comprising the reservation field.

29. The method of claim 26, wherein the one or more resources comprise a second resource configured for single frequency network-type transmission and the second sidelink signaling is transmitted using a first communication beam in the resource configured for single frequency network-type transmission,
wherein the method further comprises:
retransmitting the second sidelink signaling using a second communication beam different from the first communication beam in the second resource configured for single frequency network-type transmission.

* * * * *